United States Patent
Tunnell et al.

(10) Patent No.: US 10,643,245 B2
(45) Date of Patent: May 5, 2020

(54) PREFERENCE-DRIVEN ADVERTISING SYSTEMS AND METHODS

(71) Applicant: NXT-ID, Inc., Shelton, CT (US)

(72) Inventors: Andrew Tunnell, Palm Bay, FL (US); Sean Powers, Melbourne, FL (US); David Tunnell, Palm Bay, FL (US); Jacob Zurasky, Orlando, FL (US)

(73) Assignee: Nxt-ID, Inc., Sebastian, FL (US)

( * ) Notice: Subject to any disclaimer, the term of this patent is extended or adjusted under 35 U.S.C. 154(b) by 488 days.

(21) Appl. No.: 15/212,161

(22) Filed: Jul. 15, 2016

(65) Prior Publication Data

US 2018/0018704 A1  Jan. 18, 2018

(51) Int. Cl.
*G06Q 30/02* (2012.01)

(52) U.S. Cl.
CPC ..... *G06Q 30/0269* (2013.01); *G06Q 30/0251* (2013.01); *G06Q 30/0261* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 7,822,635 B1 * | 10/2010 | Brown et al. | G06Q 30/00 705/14.1 |
| 8,442,864 B2 | 5/2013 | Chopra | |
| 8,484,310 B2 | 7/2013 | Aarts | |
| 8,489,112 B2 | 7/2013 | Roeding | |
| 8,656,460 B1 | 2/2014 | Bari | |
| 8,775,241 B2 | 7/2014 | Bortolin | |
| 9,014,963 B1 * | 4/2015 | Kolton | G06Q 30/02 701/300 |
| 9,420,044 B2 | 8/2016 | Gupta | |
| 2003/0097451 A1 * | 5/2003 | Bjorksten | G06F 21/10 709/228 |
| 2006/0217072 A1 * | 9/2006 | Poyhonen | H04W 88/06 455/67.11 |
| 2007/0043720 A1 * | 2/2007 | Koenig | G06Q 30/02 |
| 2007/0214041 A1 * | 9/2007 | Patel | G06Q 30/02 705/14.55 |
| 2009/0005973 A1 * | 1/2009 | Salo | G01C 21/3682 701/533 |
| 2009/0144155 A1 * | 6/2009 | Lora | G06Q 30/02 705/14.62 |
| 2009/0287564 A1 | 11/2009 | Bishop | |
| 2010/0063880 A1 * | 3/2010 | Atsmon | G06Q 10/0637 705/14.53 |
| 2010/0070357 A1 * | 3/2010 | Fenton | G06Q 10/10 705/14.16 |

(Continued)

FOREIGN PATENT DOCUMENTS

| | | |
|---|---|---|
| EP | 2357035 | 8/2011 |
| WO | 2015009427 | 1/2015 |

*Primary Examiner* — Vincent M Cao

(74) *Attorney, Agent, or Firm* — Beusse, Wolter, Sanks & Maire PLLC; John L. DeAngelis

(57) ABSTRACT

The present invention relates to a person's personal preferences. These personal preferences are detected or determining according to several different systems and methods and based on these preferences personal services are provided to the person. Certain embodiments of the invention utilize a "so-called" smart card, including a card with EMV contacts, for determining those preferences and/or for providing services.

10 Claims, 29 Drawing Sheets

(56) References Cited

U.S. PATENT DOCUMENTS

| | | | |
|---|---|---|---|
| 2011/0010243 A1* | 1/2011 | Wilburn | G06Q 30/02 |
| | | | 705/14.53 |
| 2012/0130885 A1 | 5/2012 | Feiereisen | |
| 2013/0173336 A1* | 7/2013 | Evans | G06Q 30/0201 |
| | | | 705/7.29 |
| 2013/0282474 A1 | 10/2013 | Postrel | |
| 2014/0136309 A1 | 5/2014 | Goldman | |
| 2014/0136353 A1 | 5/2014 | Goldman | |

* cited by examiner

PREFERENCE-DRIVEN ADVERTISING SYSTEMS AND METHODS

CROSS-REFERENCE TO RELATED APPLICATIONS

The present application claims priority, under 35 U.S.C. 119(e), to the provisional patent application filed on Jul. 15, 2015, assigned application No. 62/192,688, and entitled Method and System for Securely Suggesting Loyalty and Payment Account Information and Advertise Consumer Information, which is incorporated herein.

The present application also claims priority, under 35 U.S.C. 119(e), to the provisional patent application filed on Jul. 30, 2015 and assigned application No. 62/198,817, entitled Methods and Systems Related to Multi-Factor, Multi-Dimensional Hidden Security PINs, which is incorporated herein.

The present application also claims priority, under 35 U.S.C. 119(e), to the provisional patent application filed on Jul. 30, 2015 and assigned application No. 62/198,989, entitled Electronic Crypto-Currency Management Method and System, which is incorporated herein.

The present application also claims priority, under 35 U.S.C. 119(e), to the provisional patent application filed on Dec. 2, 2015 and assigned application No. 62/262,138, entitled Method and System to Organize and Manage Financial Transactions, which is incorporated herein.

FIELD OF THE INVENTION

The present invention relates to the general field of consumer data management and mobile services, specifically personalized services and preference management.

BACKGROUND OF THE INVENTION

Today, more information is collected about an individual than ever before in order to personalize advertisements and marketing, as well as products and services. Data collection prior art includes methods such as a variety of web analytics that collect user behavior while on the internet. Likes and dislikes, number of clicks on topics, previous search results, transaction trends and the like are all used with methods such as AdSense and others to personalize marketing to the individual products and services that the individual has shown interest in the past. Yet, collection of information is more difficult away from the computer, where vacationers, shoppers and the like frequent. Furthermore, some individuals may wish to have information collected from them, while others may not. Likewise, privacy is also a concern between some consumers who like to receive advertisements and others that do not.

It is well-known to those in the art that relevance-driven advertising yields better results than general digital marketing and merchandising techniques. WO 2008170176 A2 illustrates a method is used wherein advertisements may be sent out to consumers who "opt in" to a given advertisement network. In some embodiments advertisements may be sent based on the user's personal preferences, while in other embodiments, directed advertising may be based on the user's search history. EP 2357035 A2 discusses a method is used wherein an advertising server sends advertisements to an advertising engine, which is capable of receiving the advertisements through a given application.

US published patent application 20140136309 describes a method to pay electronically with a single financial card from a single account. Herein, an intermediary account is utilized to make a payment. First, a transaction-processing request is sent to an optimization engine, which then processes the information as directed by a database. A second transaction request is then sent to a financial instrument of the intermediary account such as a credit card. In some embodiments, the financial instrument is selected to benefit the consumer. For example, in some cases the financial instrument with the most rewards may be selected. Similar methods are described in prior art such as US published patent application 20140136353 and WO 2015009427 A1.

US published patent application 20120130885 describes a method wherein a buyer is identified with a given institution. Some embodiments include methods wherein a time interval is used to add security, while in other embodiments biometrics may be used to identify the user.

Described in US published patent application 20090287564 is a method and system to process a transaction. Herein an account is selected by given computer instructions. In some embodiments these instructions select the account for the transaction based on given rewards information.

Described in U.S. Pat. No. 8,489,112 is a method and system to send awards to a mobile phone, when the mobile phone enters an enclosed space. The phone is detected when it replies to an ultrasonic sound sent by a transmitter within the enclosed space. A computer server then responds by sending an award to the mobile phone. In some embodiments, the enclosed space may be a retail store. The retail store may then, as in one method, recognize the award as having monetary value.

US published patent application 20130707895 is a method and system to advertise marketing information to a mobile device. The method described utilizes a series of tracking devices and tags along with a custom sales presentation module to communicate and send advertising and monetary rewards information to a user's mobile device. Advertising information is displayed graphically to the user and in some embodiments the user may respond to the advertisements.

Described in US published application 20130282474 is a method and system to provide rewards to a mobile computing device. In some embodiments as described herein, the mobile computing device is a multi-dynamic card, which is utilized to receive rewards based on the information it may give to a merchant terminal. The more information the card provides, the more rewards it receives. In some embodiments, the reward may only be activated and used after the multi-dynamic card has been shown to the merchant terminal.

Some prior art, such as the method described in U.S. Pat. No. 8,775,241 uses a POS system to advertise rewards to the consumer. Herein, a user is able to scroll through a series of different rewards options as in some embodiments, while also being able to store loyalty information on his smart card as in other embodiments.

DETAILED DESCRIPTION OF THE PREFERRED EMBODIMENTS

Before describing in detail the particular methods and apparatuses related to mobile services to support information transfer between individuals and other entities to facilitate personalized transactions such as but not limited to travel, entertainment, retail and financial, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The following embodiments are permissive rather than mandatory and illustrative rather than exhaustive.

The present application describes several different inventions related to, in one sense, a person's personal preferences. Detecting or determining those preferences and providing personal services responsive to those services are two aspects of the present invention. Certain embodiments of the invention utilize a "so-called" smart card, including a card with EMV contacts, for determining those preferences and/or for providing services.

Figure 1:
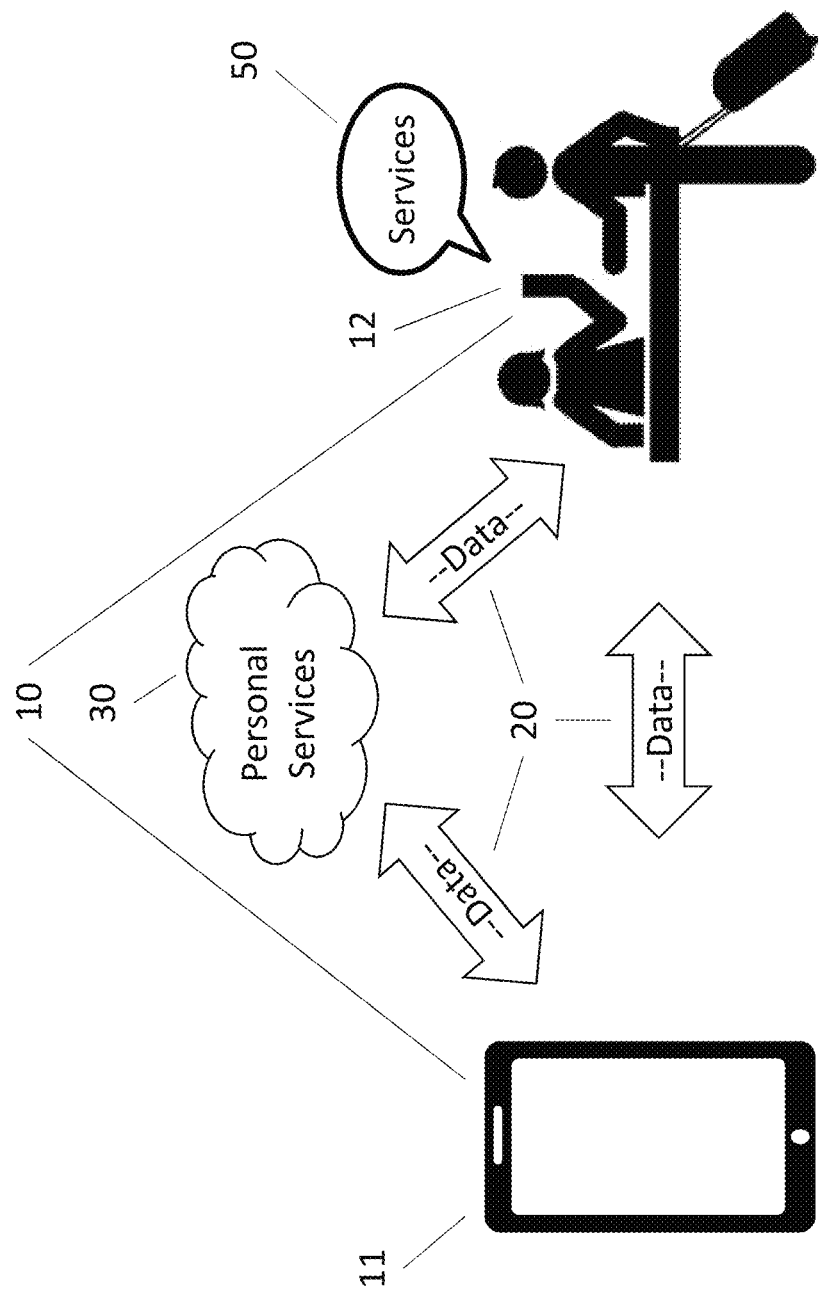
FIG. 1 illustrates a the provision of a greeting personal service.

PROVIDING PERSONALIZED SERVICES SUMMARY: This invention describes methods and systems to securely collect, manage and distribute data between two or more devices 10 to facilitate personalized services as shown in FIG. 1. "Personalized services" 30 modify or customize content in response to data received about one or more individuals, devices, and/or objects, called "entities" hereafter.

Personalized services enhance user experience while facilitating various activities such as but not limited to advertising, commerce, security, retail, marketing, event/location driven multi-media and virtually any type of exchange between an individual and devices by customizing content responsive to preferences received from users or user devices. Services may be distributed across one or more devices that negotiate with one another to transfer data, with the owner's permission, which can be granted at the time of data exchange, or in some embodiments, pre-authorized prior to the time of data exchange.

BASIC DESCRIPTION: As a non-limiting example, FIG. 1 describes a first device 11, a cell phone in this example, receiving and sending data 20 to a second device 12, a Point-of-Sale (PoS) terminal in this example, that then personalizes one or more services 50 in response to the data received from the first device. In a simple example, the personalized response could be a greeting by a second individual, provided in response to data received from a second device, to welcome a first individual by name, member, or other identification data provided to the second device from the first device.

As a non-limiting extension to this example, the first device 11 may perform a transaction with a second device 12, whereby the account chosen to make a payment on the first device 11 is suggested (or personalized) by the second device 12 to the first device based on preferences, location, merchant, loyalty, rewards or other information, as non-limiting examples, provided by the first or second devices 10. One or both of the devices 10 could then send personalized data 20, information specific to this transaction or loyalty/reward in this example, to the other, or one or both devices 10 may reach-back to one or more remote services 30 or a third device (not shown) that then sends data 20 to one or more of the first or second devices 10.

As people shop, travel, conduct transactions, or dine and the like, they like to take a number of items along. Unfortunately, few of these items are convenient to carry while at the beach or pool, and the collection of multiple devices make it difficult to manage within pockets while on a run or other exercise. Cell phones, wallets, room keys and the like are all items that are considered must haves while traveling, but don't necessarily conform to swimming in salt water or playing in the sand. Furthermore, no one device provides users with all the utility they may require while on vacation, shopping, or dining.

To further illustrate the system of personalized services 30 responsive to data 20 from one or more other devices, one device 12 become aware to the presence of a first device 11 may exchange data 20 between the devices 10 in close proximity with one another to promote personalized services 50, with reach-back to remote services 70 for closed-loop systems between devices or services that are remote to one another as shown in FIG. 1.

Figure 2:
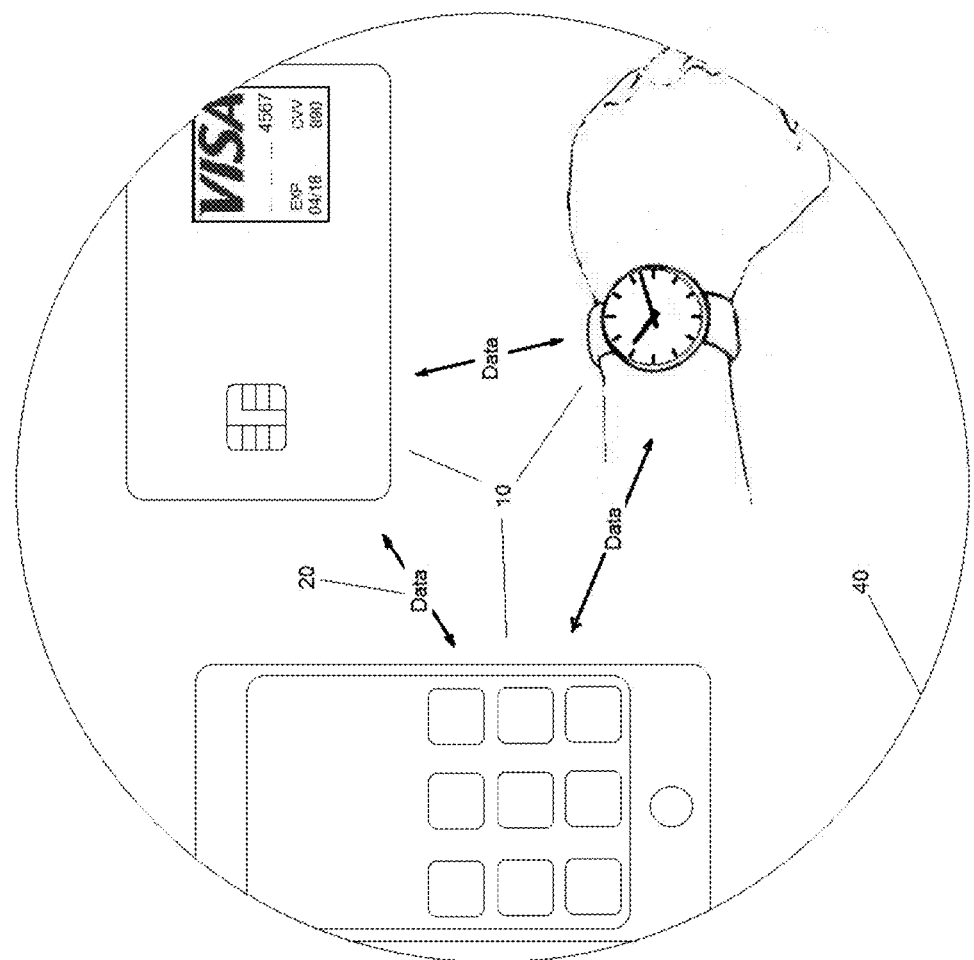
FIG. 2 illustrates devices for sharing preferences for use in tailoring personal services.
Figure 3:
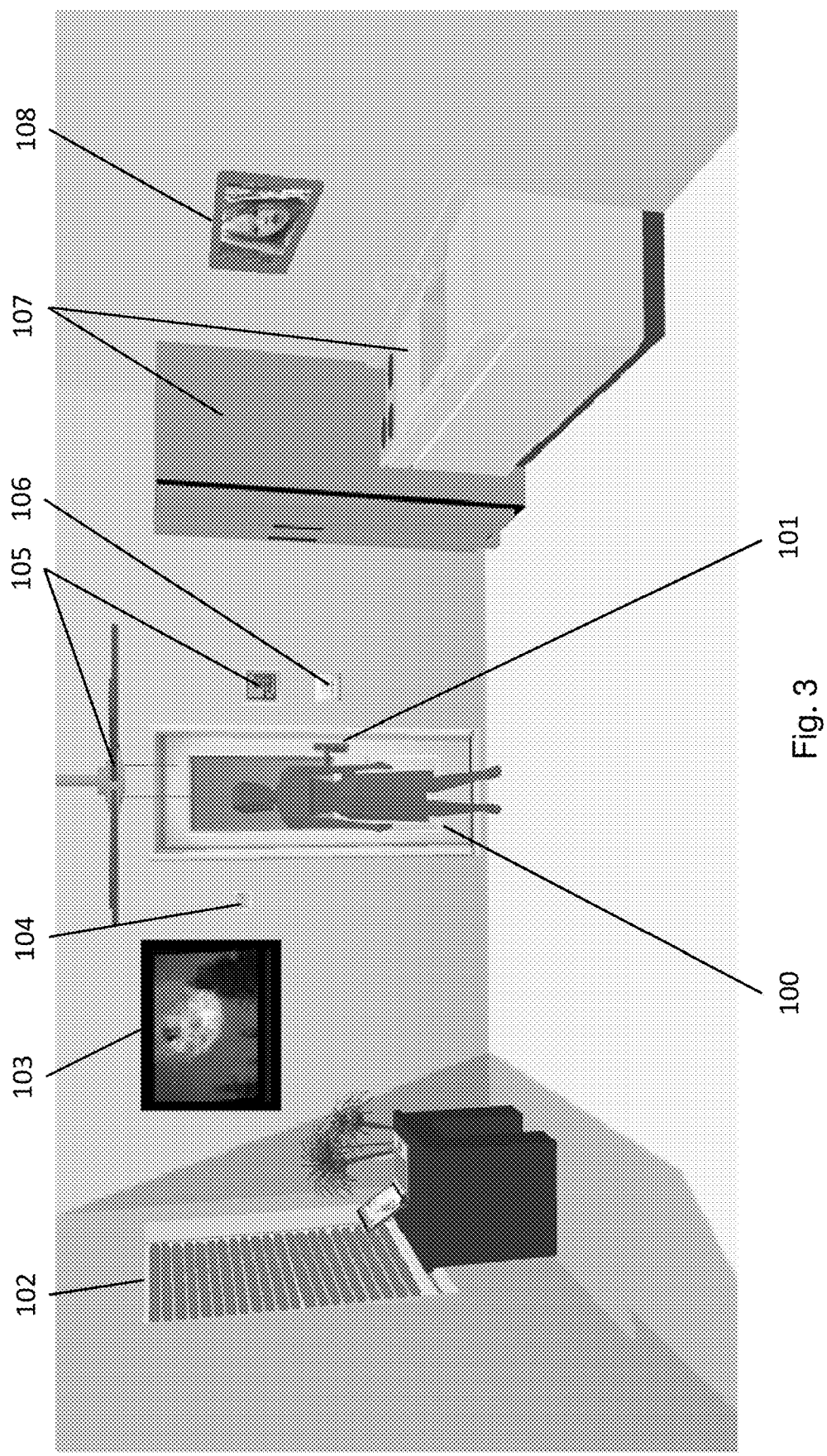
FIG. 3 illustrates an IoT environment.

This non-limiting example illustrates how a first device may become aware of a second or more devices described herein and may not only support services among devices that are local to one another as shown in FIGS. 2 and 3, but also devices that are remote to one another, or combinations of local, remote, network topologies, peer-to-peer, RFID, Bluetooth, Internet of Things (IOT) and the like to enable extended ecosystems that include devices that are remote and/or local in proximity to one another as shown in FIG. 1.

ECOSYSTEMS/RELATIONSHIPS BETWEEN DEVICES AND HOW THEY COMMUNICATE TO PASS INFORMATION—INTER-AWARE: According to embodiments of the present invention, one or more of these features may be supplied within one or more devices 10 that interact with data 20 to provide personalized services. These collections of devices and services that interact and/or become inter-aware with one another as shown in FIG. 2 are referred to as "inter-aware systems", groups, "clusters" or "ecosystems" 40, hereafter.

IOT (INTERNET OF THINGS) AND OTHER DEVICE ECOSYSTEMS: The invention is not limited by any one specific form factor or device, but may consist of electronics within various devices including IOT (Internet of Things) devices, wearables, portables, mobile devices, computers and the like, collectively called "devices" hereafter. Likewise, the grouping, clusters and/or interactions between devices are not limited to a single "ecosystem" of devices and applications, but rather transcend device interactions, network topologies, and communications protocols to include but not be limited to Bluetooth, Bluetooth Low Energy (BLE), beacons, RFID (Radio Frequency Identification), wake-up signals, communication "advertisements" or the like. As one device detects the presence of one or more other devices, services may be personalized in response to data shared among devices.

DEVICE DESCRIPTIONS: In some embodiments, personalized services may not be limited to a single device, but rather distributed among multiple devices as described in co-owned U.S. patent application Ser. No. 15/018,496 entitled Distributed Method and System to Improve Collaborative Services Across Multiple Devices, filed Feb. 8, 2016, which is incorporated herein in its entirety. For instance, mobile, wearable and other transitory systems may interact within an IOT (Internet of Things) ecosystem as described in FIG. 3. IOT devices include but are not limited to wearables on an individual 100, and/or door locks 101, blinds 102, televisions 103, home automation devices, thermostats 104, lights, fans, light switches 105, alarm systems 106, appliances 107, digital picture frames 108, cooking tools, music equipment, gaming equipment, desktop computers, computer servers, laptop computers 109, vehicles, garage door openers, keyless locks and other devices that facilitate the "internet of things."

Wearables (or wearable devices) may include but are not limited to watches, bands, glasses, jewelry, shirts, pants, belts, belt buckles, buttons and the like. Jewelry could include but is not limited to rings, bracelets, anklets, necklaces, ear rings, nose rings, cuff links and the like.

Portables may include but are not limited to wallets, cards, smart cards, smart wallets, key chains, accessories, glasses, FOBs, pens, and the like.

Mobile devices may include but are not limited to phones, tablet computers, laptops, and the like.

Computers may include but are not limited to a point-of-sale (PoS) terminal or a device operative with a point-of-sale location, personal computers, servers and the like. Such computers may include both or either transitory and non-transitory memory elements.

TYPES OF PERSONALIZED SERVICES: Personalized services 50, some shown in FIG. 4, may include but are not limited to services that relate to one or more of the following: a wake-up or prompt, hospitality 51, identification (ID) 52, information 53, business card, contacts, authentication 54, security, cryptographic (crypto), tokenization 55, transaction 56, preferences 57, preference collection 58, preference analytics 59, accounting 60, budgets, finance, fraud detection, notification 61, administration 62, food 63, beverage, smoking, grocery, refrigerator contents, accommodations 64, check-in/check-out, room key, travel 65, shopping 66, advertisements 67, sales, discounts, coupons, promotions, location, proximity, reward 68, loyalty, environmental, entertainment, medical conditions, medical records, health 69, exercise, pedometer, fall detection or other services that are customized in response to the personal information and the like, collectively called "personalized services" or "services" hereafter.

Any one or more of the devices 10 could provide preferences or execute personalized services 50 within the group 40.

Figure 4:
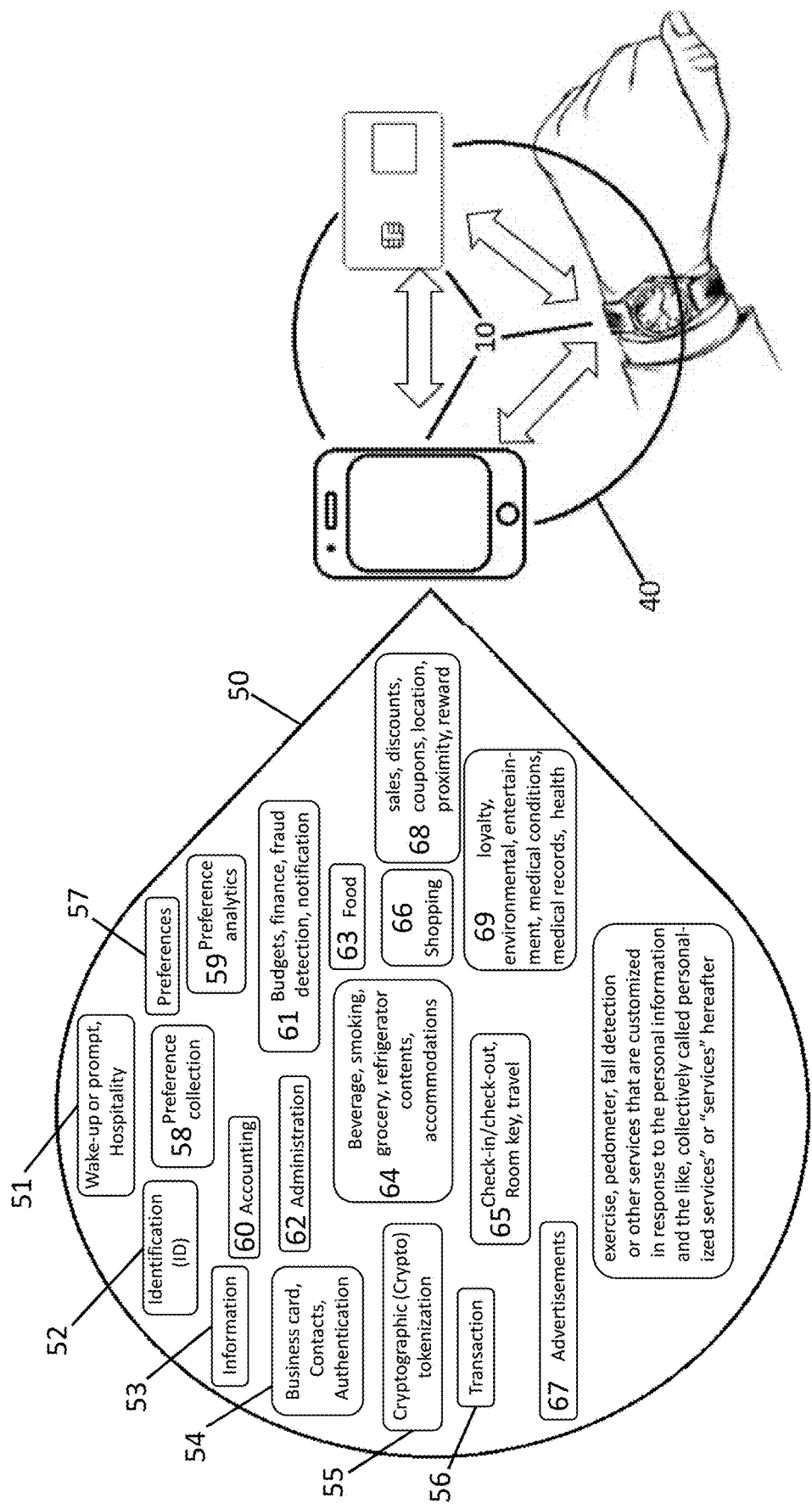
FIG. 4 illustrates services.

DATA AND INFORMATION AS RELATED TO PERSONAL SERVICES: Data 20 or information may be sent between devices 10 within a group 40 as shown in FIG. 2 and FIG. 4. Data may be transmitted between devices according to various communications systems and protocols, including but not limited to signals, beacon, advertisement packet, RF (radio frequency signal) such as but not limited to NFC (Near Field Communication) or WiFi, RFID (Radio Frequency Identification), voltage or communications via a physical contact, inductive signals, magnetic signals, messages, movements, prompts, and other methods that wake-up or prompt a device to make it aware of the proximity of another device, collectively called "wake-up data" hereafter.

Data or information that can be carried during a communications session include but are not limited to: names, pictures, identification, initials, biometrics, behavior metrics, distinguishable characteristics, social security, numbers, membership numbers, birthdays, height, weight, hair color, eye color, licenses, passports, visas and virtually anything that identifies an individual, user, device and/or object, collectively called "identification data" hereafter; business card, telephone contact information, address, and other contact information typically found on a business card or contact record, collectively called "contact information" hereafter; addresses, locations, secrets, numbers, pictures, biometrics, voter registration and any personal data, collectively called "private data" hereafter; categories, labels and the like called "administration or administrative data" hereafter; locations, acknowledgement, device identifiers, store, store identifiers, names, coordinates, geolocation, movement, direction, distance, radius, number of steps, inter-device awareness and the like, collectively called "proximity" information hereafter; preferred seating, cuisine, dishes, meals, food, drinks, deserts, snacks, spice, hotness, allergies and other eating related preferences collectively called "dining preferences", "eating preferences" or "drinking preferences" hereafter; favorite rooms, floors, bed size, pillow, bed top, views, temperature, wake-up time, amenities and other room, hotel, housing, resort or sleeping preferences, collectively called "accommodation preferences" hereafter; seating, pre-screen for security, ticket and travel information and the like, collectively called "travel preferences" hereafter; frequent shops, purchase categories, purchase items, spending amounts and the like, collectively called "shopping preferences" hereafter; other preferences called simply "preferences" hereafter; sales, bargains, products, services, discounts, refunds, specials, coupon, discount and other advertisements, collectively called "advertisement data" hereafter; accounts, payment account numbers (PANs), ATM numbers, brands, cryptograms, currency, crypto-currency, tokens and other financial data and the like, collectively called "financial data" hereafter; purchases, receipts, currency, amounts sales, prices, items, codes, and other transaction related information, collectively called "transaction data" hereafter; rewards, points, numbers, loyalty, bar codes and other reward information and the like, collectively called "reward data" hereafter; medical history, conditions, surgeries, health issues, vitamins, medicines, pharmacies, insurance and other medical related information, collectively called "medical data" hereafter; biometrics, knowledge-metrics, electronic metrics, behavior-metrics, names, user names, passwords, PINs (personal identification numbers), credentials, cryptograms, tokens, codes, pairing codes, dynamic pairing codes, and biometrics such as but not limited to face, pictures, voice, fingerprints, voice, iris, scent, heartbeat, behavior metrics, gestures, images, distinguishing characteristics, symmetric, asymmetric, addresses, locations, secrets, numbers, voter registration identifiers, social security, numbers, birthdays, height, weight, hair color, eye color, licenses, passports, visas, passcodes, questions, answers to questions, symmetric and asymmetric and any information that authenticates or identifies a user, a device or an object, collectively called "authentication data" hereafter; room, beds, size of beds, pillow, temperature, number of days, check-in and check-out dates, room rate and other information relating to checking into a room, collectively called "check-in data" hereafter; categories, codes, transaction, currency, amounts and other accounting or budget data, collectively called "accounting data" or "budget data" hereafter. Data may also be referred to as "information" herein.

Consumer items may include but are not limited to: Food, beverage, smoking, seating (Dining or Snacking?) and the like; travel, cruises, vacations, locations, resorts, recreational activities, transportation, and the like; real-estate, homes, condominiums and the like; entertainment, multimedia and the like; health, medical, vitamins, pharmaceuticals, exercise, spas and the like; accommodations, hotels, motels, resorts, bed-and-breakfasts and the like; products, toys, automobiles, and the like.

TRIGGERS THAT MAY BEGIN PROVISION OF PERSONAL SERVICES: Personalized services may be activated based on a various triggers, including but not limited to a user's activity, a timer, a specific time, or a time interval, a response to a query, a transaction, motion detected or specific motion detected such as walking, running, standing, driving, or sleeping. In this way, power is conserved through activating of personalized services only when a user is active.

DETECTING PRESENCE OF DEVICES FOR DELIVERY OF PERSONAL SERVICES: Devices may be detected or sensed by a number of methods and system, including but not limited to beacons, advertisements (such as Bluetooth communicated advertisements, or advertisements communicated using other communications systems), notifications, prompts, wake-up signals, triggers, or other communication methods or systems that prompt or communicate information to or from a device or service. For example, a first device may make a second device aware of its presence As a user or first device comes within a zone or range of a second device, the second device senses proximate presence of the first device or a location of the first device, and arranges for the provision of services to the user or to the first device responsive to the proximate device or location.

PRESENCE ZONE: A zone may be a range of approximate 100 meters or less in some close proximity applications, although there are no limitations on the range of a "zone" as such depends on the ability of the communicating devices to "see" each other.

COMMUNICATIONS SYSTEMS AND METHODS TO PROVIDE PERSONAL SERVICES: Communication techniques are important for many facets of the present invention and those skilled in the art are aware of many such systems that can be used depending on the desired outcome and the distance between communicating entities. Some examples of such communications techniques for communicating to a first device or from the first device to a second device include, but are not limited to: Bluetooth, Bluetooth Low Energy (BLE), WiFi, RFID (Radio Frequency Identification), RF (Radio Frequency), WiFi, QR codes, light, ultrasonic, sound and the like.

DEVICE LOW POWER STATES AND WAKE-UP SERVICES: In one embodiment, the electronics devices are held in an ultra low-power state including but not limited to powered-off or an ultra low-power state. One or more circuits may be awakened by a variety of methods including but not limited to motion, movement (via accelerometer, gyro, magnetometer, piezo device or equivalent movement sensing component), timer, wake-on-sense (a method that detects 13.56 MHz from Near Field Communication transmission), or via a clever sensing method that utilizes no additional power by sensing a human touch as an interrupt, collectively called "wake-up methods" hereafter.

These methods and systems for waking-up circuitry within the device may be configured, in some embodiments, to either be completely passive, where a device wakes-up and/or utilizes power from the environment to perform a function or action. In other embodiments, devices utilize non-rechargeable power sources, such as but not limited to primary batteries, or power sources that may be charged such as but not limited a super capacitor or equivalent power source. In some embodiments, rechargeable power sources may or may not be separate from one or more batteries that power the rest of the circuitry.

Once the circuit containing one or more microprocessors and/or programmable logic is awakened, it may be configured to immediately perform features, such as but not limited to beacons, signals, advertisement packets, communications, low power sensing or the like, collectively called "communications" hereafter.

MOTION STATES TO REDUCE POWER CONSUMPTION: A variety of intervals for transmission and/or receiving may also be configured to further reduce power. Beacons and/or communications may be configured to transmit or receive based on a duty cycle or interval. These intervals may be changed based upon the state of motion or user-defined states or times. "States" may be derived by user interaction or in some embodiments, movement. Those familiar with the art recognize that a multi-state machine may be used to manage the states of a device such that functions and features may be controlled by the current state of the device. Thus, transmission, reception, intervals or duty cycles and the like may be dynamically changed based on the state of motion detected.

TRANSMISSION OF BEACON AT INTERVAL BASED ON MOTION: When motion is detected, the interval between beacons or other communication signals may be changed based upon the characterization of the motion(s).

For a non-limiting example, walking may be differentiated from handling or small movements, driving, falling, or stationary, collectively called "motion states" hereafter. Motion may be characterized or detected via several methods and devices including but not limited to an accelerometer, gyro, piezo device, magnetometer or other motion sensing components or devices. Using such components, motion states may be detected based on measured acceleration and/or direction over some interval or duty cycle. Like communication, motion measurements may also be controlled via duty cycles and intervals and dynamically changed based on the state of the device to conserve power.

SLEEP STATE: A device may be placed and/or put itself into a sleep state based on inactivity. During this inactivity, the interval of communications may be reduced or communications not performed at all. Conversely, as a person is walking, the device could wake up and communicate at some interval. Likewise, if motion is characterized as driving, a different communication interval may be configured for that specific device state.

SLEEP STATES/LOW POWER: The first or second devices may be kept is a "sleep state" to conserve power.

Methods to awaken a device from a sleep state include beacons or the sending/receiving of other radio-frequency signals or electromagnetic field (EMF) emissions, a button or other manual action, detection of location, motion, specific motion activation comprising at least one of walking or running or standing or sleeping or driving, or combinations.

TRIGGERING AND AWAKENING: Once awakened or triggered, a device may detect the presence of another device, or in some embodiments, begin transmitting a signal so that the other device can detect the proximity of the signal-originating device. Personalized services are triggered responsive to detection of a triggering device, triggering individual or triggering object in close proximity to the user.

NO-BUTTON DEVICE (USING MOTION): Thus, under this invention, no "button" or other activation is required to turn-on (or wake-up) the device other than to move the device, and power may be conserved by dynamically setting both the intervals to detect and/or characterize motion states, as well as communications.

WALKING AND OTHER MOTION STATES: For non-limiting examples, beacons, wake-up signals, advertising packets, advertising information and/or other communications may be configured to transmit or receive as an individual walks or travels through a defined region, for example an area within a retail store. Since most individuals walk into establishments, classification of walking is important to activate various services to communicate with one or more devices at the establishment. Alternatively, the mere presence of the individual in the establishment is sufficient to activate various services, including the delivery of advertising information.

PARAMETERS OF PERSONAL SERVICE: Parameters of delivered services are not limited to only communication, proximity, and motion detection and the like. Other service parameters may also be variable, configurable by a user and/or dictated by the "state" of any device associated with the delivery of a personal service.

AUTHENTICATION FOR APPROVAL OF INFORMATION EXCHANGE FOR OFFERING PERSONAL SERVICES: A first device may request information from a second device. The latter may respond automatically, or in some embodiments, with credentials that must be "approved for release" by the first device or by the owner or user of the first device. The approval may require some action to be taken by the first device or by the user of the first device, or the second device may be automatically approved by the user. In this instance, the user may be required to authenticate locally with the device and/or approve the release of information.

Figure 5:
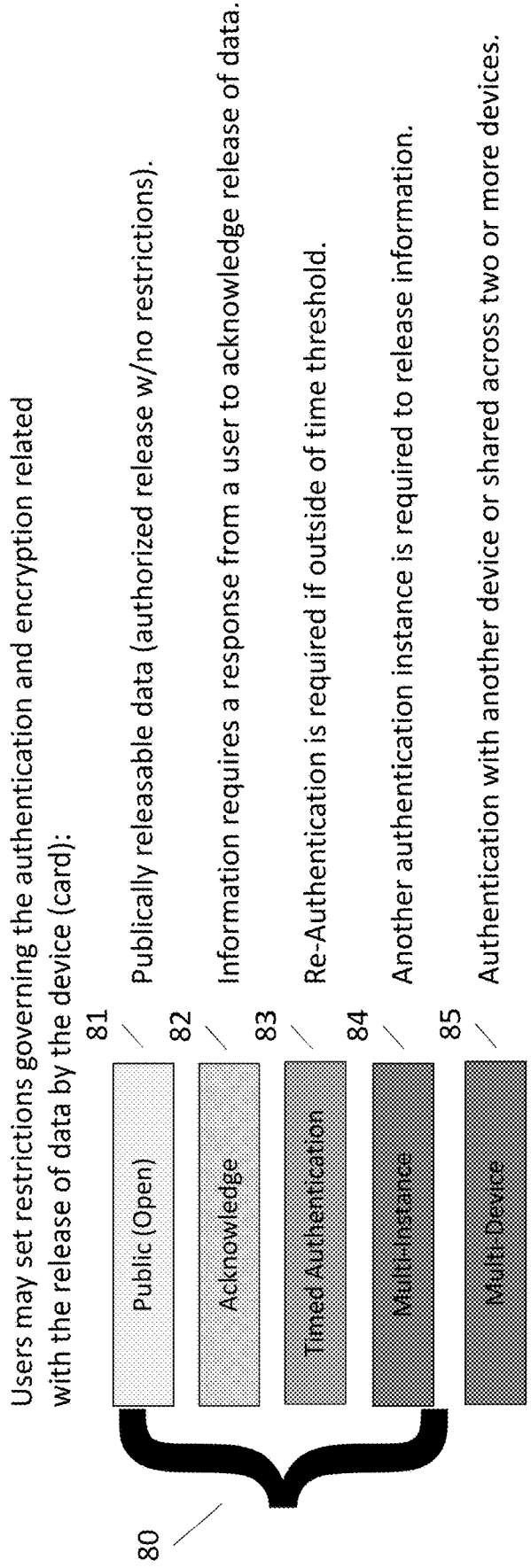
FIG. 5 illustrates restrictions on the release of data

USER CONTROL OF DATA AND AUTHENTICATION: One encompassing aspect of the present invention is that the user has control of any information sent to another party or device. Information may be categorized into classifications 80 that govern distribution such as but not limited to the example shown in FIG. 5. To maximize convenience, information classified as public 81 or "pre-approved" by its owner may be sent by the first device to other devices at any time, without interaction with the user. To increase security, other data may require acknowledgement 82 from the user prior to release of the information. Other categories include but are not limited to authentication, which could be, in some embodiments, a "timed authentication" 83 that requires another authentication based on a time duration since the last time a user has authenticated with one or more devices, and/or multi-instance authentication 84, which requires a another instance of authentication and/or authentication with a second device 85 before the information is released. Multi-instances and multiple modes of authentication are further described in patent application entitled Multi-Instance Shared Authentication (MISA) Method and System Prior to Data Access, filed on Jun. 23, 206 and assigned application Ser. No. 15/191,466, which is incorporated herein in its entirety.

Likewise, an owner may refuse to receive certain information on a device, such as certain advertisements, discounts, rewards, or other offers and/or requests for information. The owner may disable receipt of all incoming information or only information related to identified products or services. In this way, the owner of the data (user) always has control over receipt and/or release of information.

SUGGESTION OF ACCOUNT TO USE: In some non-limiting embodiments, an advertisement, for example, may ask a user to use a certain service or virtual item such as but not limited to a loyalty card. As a user enters an establishment or geographic location, the establishment may suggest the use of payment, reward, and/or loyalty accounts, and/or suggest one or more payment types or methods, as non-limiting examples. In this example, a user may accept or refuse that account or payment method suggested.

DATA MINING FOR OFFERS OR ADVERTISEMENTS: One method of the present invention entails using data mining (a form of determining user preferences) to direct advertisements or offers to users. In some embodiments (non-limiting), information including but not limited to past purchases or items searched (on-line and off-line) may be utilized in correlation with or without one or more given algorithms to direct advertisements or offers that may be pertinent to the user. A user may also disable advertisements or reject advertisements and/or the data mining feature in some non-limiting embodiments.

DERIVING PREFERENCES DIRECTLY FROM USER OR FROM DATA MINING: A unique feature of this invention is that preferences may be directly input to a first device by a user, or in some embodiments, derived from data mining efforts during user activity. Under this aspect of the invention, a user's preferences may be determined from user interaction with a first device and between a first device and other devices. These preferences can then be used to provide personal services to the user.

DERIVING PREFERENCES FROM OFF-LINE ACTIVITY: This invention bridges the gap between brick-and-mortar consumer behavior and internet consumer analytics by tying off-line user interactions of brick-and-mortar establishments with one-line user interactions on the internet. Offline user behavior is becoming more accessible with the advent of the internet of things, wearable and mobile devices. Activities that can be detected and collected by this device include exercise, eating, drinking and smoking habits, movement to frequent locations that as well as interactions with brick-and-mortar establishments such as but not limited to transactions, movement and consumer locations within a store indicating possible interest in products, transfers of data such as medical information, etc.

DERIVING PREFERENCES FROM ONLINE BEHAVIOR: Online consumer behavior, likes and dislikes, and other interest captured by cookies and other methods of Big Data online are well-known. Number of clicks, websites visited, purchases, likes and dislikes, responses to questionnaires and the like are all consumer analytics that are used to sell to businesses and marketing firms and even pop up new advertisements responsive to information gathered about a user.

CONSUMER BIG DATA—DATA ANALYTICS AND MERGING PREFERENCES FROM ONLINE AND OFFLINE BEHAVIORS: Under this invention, information collected during any of these user activities may be stored on a first device. The information collected may be analyzed on the first device or in some embodiments, downloaded to a second or third device and analyzed there. Those well-versed in the art will recognize that data analytics of consumer data consists of determining features, trends, characteristics, likes and dislikes, and other information collected about consumers or people or user behavior. In the context of this invention, this information may be analyzed to derive preferences, or in some embodiments, merged with other data. Likewise, preferences from offline, online, or combinations may be may be modified, merged, added, deleted or administered with preference from online services.

PRIORITY AND WEIGHT: In some embodiments, a user may have control over these preferences, how and when they are made available to various service providers, and their priority or weight so that they may be prioritized within algorithms, statistical analysis and other mathematical calculations by service providers so that they may best customize the service for one or more preferences from a plethora of user preferences. The priority or "weight" may be used by services to determine "how much" a person likes or dislikes a certain product, service or activity. Service provides may use the priority or weight to personalize the service, content or other information, products or services.

PREFERENCE ADMINISTRATION: Whether derived or selected or input, etc., a user may modify, add, delete or administer the preferences in any devices in which the preferences are stored, whether online or off-line.

UPDATING PREFERENCES: Once the preferences are determined, they may be supplied to update the personal preferences stored in the first device from at least one of a second device, a computer, a wearable, an IOT device, a portable device, a mobile device, a website, a service, an application or software.

COFFEE SHOP EXAMPLE: For instance, as a non-limited example, a user could walk into a coffee shop and place an order. Information that could be collected during this action by a first device includes selecting the establishment and time entered, time spent looking at a menu, the time looking at an advertisement or "special of the day", the product and/or amount purchased, any reward, loyalty, coupons, discounts or advertisements used with the transaction, the time spent within the establishment, any other subsequent products and/or amounts purchased, and the time the user (and the first device) left the building.

BUSINESS PROMPTING—COFFEE SHOP EXAMPLE: The user in the coffee shop may also be queued by a first device at the end of the activity (leaving the coffee shop) to administer one or more preferences derived from this activity. For instance, the user could state whether he or she liked or disliked the product, the business, the brand, the service, etc. Of course, any data analytics or preferences regarding the user could also be sent back to the business or establishment.

MULTIPLE PREFERENCES AND PRIORITY: In some embodiments, more than one preference or a combination of (weighted) preferences may be utilized as part of the personalized service. In other embodiments where more than one device with preferences is present, a calculation such as but not limited to an average, aggregate, number of priority preferences, range, etc. could be performed to determine which personalized service is to be supported, and what modifications to that service need to be performed to personalize the service (or better personalize the service) based on the multiple user preferences. Herein, the priority or weight given to various preferences could be a factor in the determination of which service to use and which modifications to perform with each service.

In some embodiments, weights could be increased based on increase behavior or habits of the user. For instance, if a user repeatedly orders the same coffee at the same coffee shop at the same time of day, the weight of that preference could increase. Conversely, if a user slows the frequency of drinking a specific coffee, for example, the weight would decrease.

Figure 6:
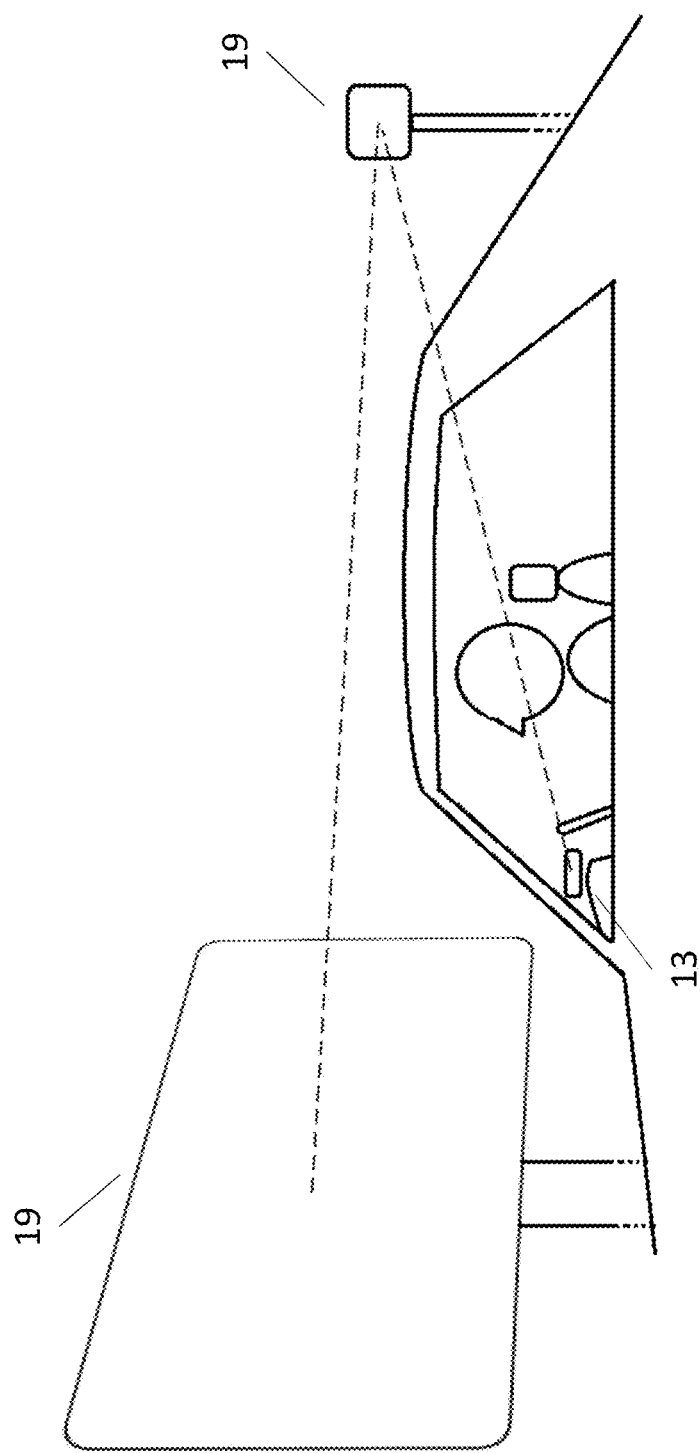
FIG. 6 illustrates providing a tailored advertisement on a billboard.

DEFINITION OF DISPLAYS AND BILLBOARDS: Non-limiting examples of a personalized service responsive to preferences communicated from more than one first device include but are not limited to advertisements on a bulletin board, display or billboard. As shown in FIG. 6, a device (as sensor by the road in one non-limiting example) 18 may detect the presence of one or more devices 13 (a device inside or attached to a vehicle, such as a smart card, for a non-limiting example). Information such as preference may be sent from the device 13 to the device 18. The device 18 may then change the content of a billboard 19 in response to the preferences collected.

Vehicles herein may include but are not limited to automobiles, trucks, bicycles, carts and virtually any multi-wheeled device.

Likewise, as individuals with the device 13 containing preference pass a display in a mall, the advertisement service on one or more display devices (including broadcast devices) can be modified to reflect the user's preferences.

Examples of broadcast devices include but are not limited to a display, a billboard or a roadside display visible from a road, a speaker, an electronic menu, video images, still images or sound on a multimedia device responsive to the user's preferences as received from the first device when the first device is within a zone of the second device. Information that may be broadcast includes images, video or text or combinations.

DEFINITION OF INFORMATION THAT CAN BE COLLECTED FOR ANALYTICS (PREFERENCE DERIVATION): Information that could be collected to aid in the derivation of preferences may include but is not limited to personal information, user activities, motion, transactions, locations, internet interaction, phone interaction, IOT (internet of things) interaction and other actions performed by a user or a first device. Information may be collected from various user activities including but not limited to actions; transactions; purchases; payments; movements; the event and time duration for entering, staying or leaving businesses or establishments or even locations within a store such as a retail counter, row, aisle or area near certain products or services, or near bulletin boards, displays, speakers or the like, or even billboards or sensors that control any of these broadcasting devices; exercise; interactions with the internet of things (IOT) or the like; or in some embodiments, internet-related interactions such as but not limited to views; website views; advertisement views; computer clicks; information displayed on a website' website content; social media activities; responses to questionnaires; data analytics or the like, as well as other data or activity rich environment where a user's preferences could be derived.

Figure 7:
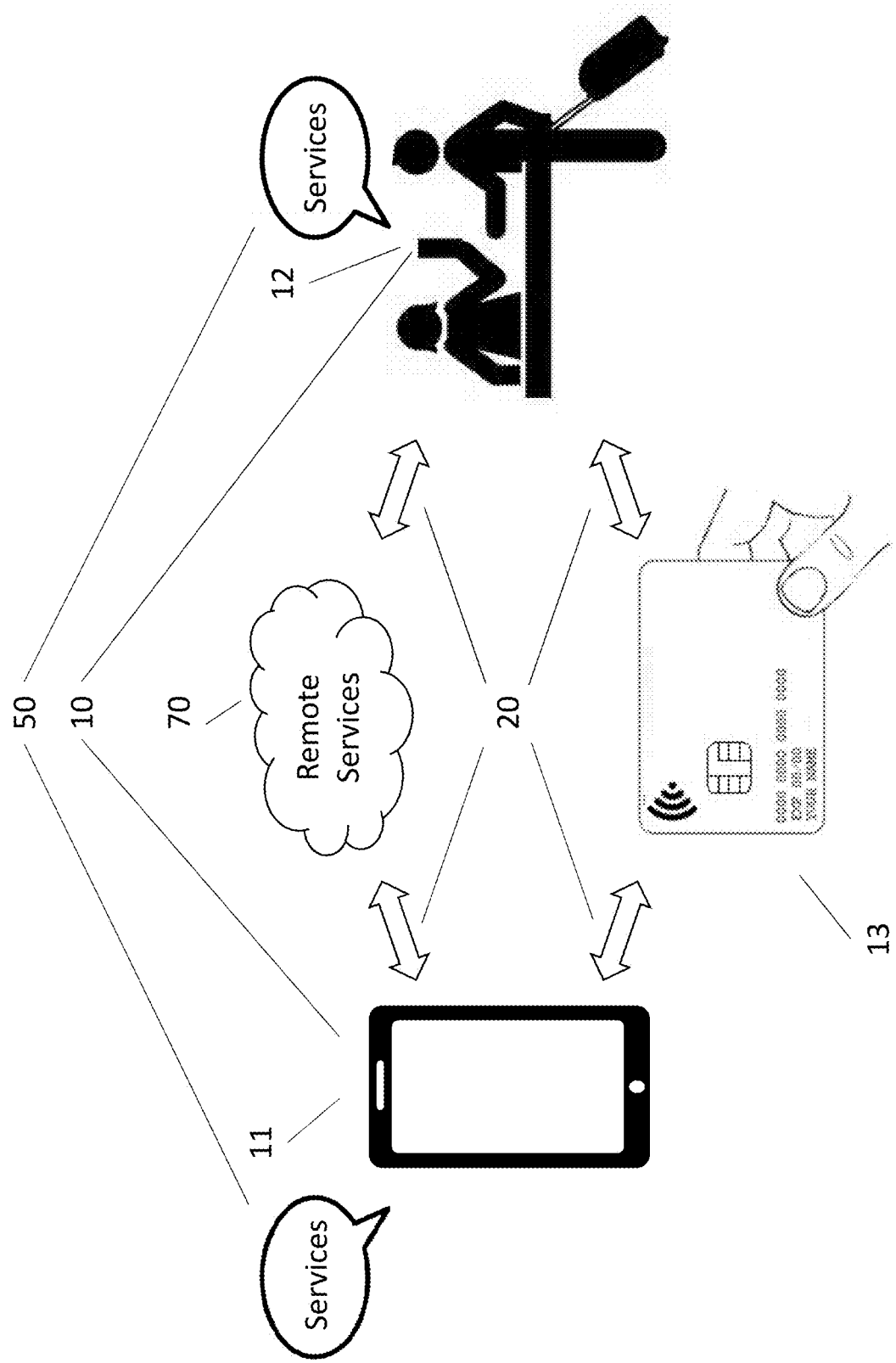
FIG. 7 illustrates a smart card.

SMART CARD INTRODUCTION: In one embodiment, a device may take the form of a smart card 13 as shown in FIG. 7. The card 13 may support standards for identification cards, or support standards for payment cards, rewards, loyalty, insurance and the like, or in some embodiments, support beacons, communications, room keys, and/or combinations of each. Similar to FIG. 1, FIG. 7 illustrates how a smart card 13, may interact with personalized services 50 on other devices 10, in this case a smart phone 11 and a point-of-sale (PoS) 12 terminal, as non-limiting examples. A smart card may be the same shape and size of a payment card, but with electronics inside.

Communications 20 such as but not limited to low-power beacons, may be utilized to detect the presence of one or more low-power devices 10 such as smart phones 11 and smart cards 13, as non-limiting examples. Like the example in FIG. 1, one device 11 may "wake-up" another device 13 to exchange data 21 between devices 10 to promote personalized services 50, with reach-back to remote services 70 (on a server 15, for example) for closed-loop systems.

PAYMENT AND COMMUNICATIONS: The invention may also support other forms of communication and payment. Communication methods include but are not limited to NFC (Near Field Communication), Smart Swipe, Wi-Mag (Wireless Magnetic Transmission), Bluetooth and/or BLE, WiFi, barcode and/or QR Code may be supported as well as contact and contactless EMV. Other communications methods may also be supported for communications as well as payment including but not limited to Personal Area Network (PAN), acoustic methods such as ultrasonic and optical methods such as infrared and dynamic QR code. Such communications techniques may involve encrypted and/or unencrypted data, authentication activities, payment activities, identification, and the like.

LOADING THE CARD: Under this invention, any one or more known communications methods can be used individually or in combination to transfer information to the card. For a non-limited example, a user may select information by swiping to scroll through credit and/or debit cards, loyalty, reward, insurance, identification and virtually any card or information found within a wallet. A user may tap a selection sensor to select a specific card and transfer that card's information to one or more of the communication channels to perform payment.

VALIDATION OF CARD DATA SERVICE: As a non-limiting example, information such as but not limited to credit card information captured by a camera on a user device may be sent to a service for validation. The service may then send encrypted information, tokens, applets, or other information back to the device to transfer back to the user device. An authentication process may also be associated with this data/photo transfer, especially if the data/photo is deemed to be private information.

AUTO-SENSING OF MULTIPLE COMMUNICATIONS TECHNIQUES): In some embodiments, the payment information may be held until a sensor is triggered for a specific payment communication channel to make the payment (transfer and/or negotiate the payment). For a non-limited example, a user device or smart card could be configured to support multiple payment communications could wait to transfer or negotiate the payment information based on sensing EMV, NFC, Magnetic Stripe, or Bluetooth. Under this embodiment, no payment information would be transferred or negotiated until the card is inserted into an EMV reader, or detects an NFC reader, or detects a magnetic stripe reader, or receives a communication over Bluetooth to make a Bluetooth payment. Once a payment communications method has been sensed, the device could disable the other payment communication methods, or in some embodiments, wait a timeout period before disabling the payment state.

SELECTING CATEGORIES: Likewise, users may configure categories whereby one or more touch or proximity sensors are used to scroll and select categories. Categories may be customized by another interface, such as a phone or computer, as well as local to the user device.

Figure 8:
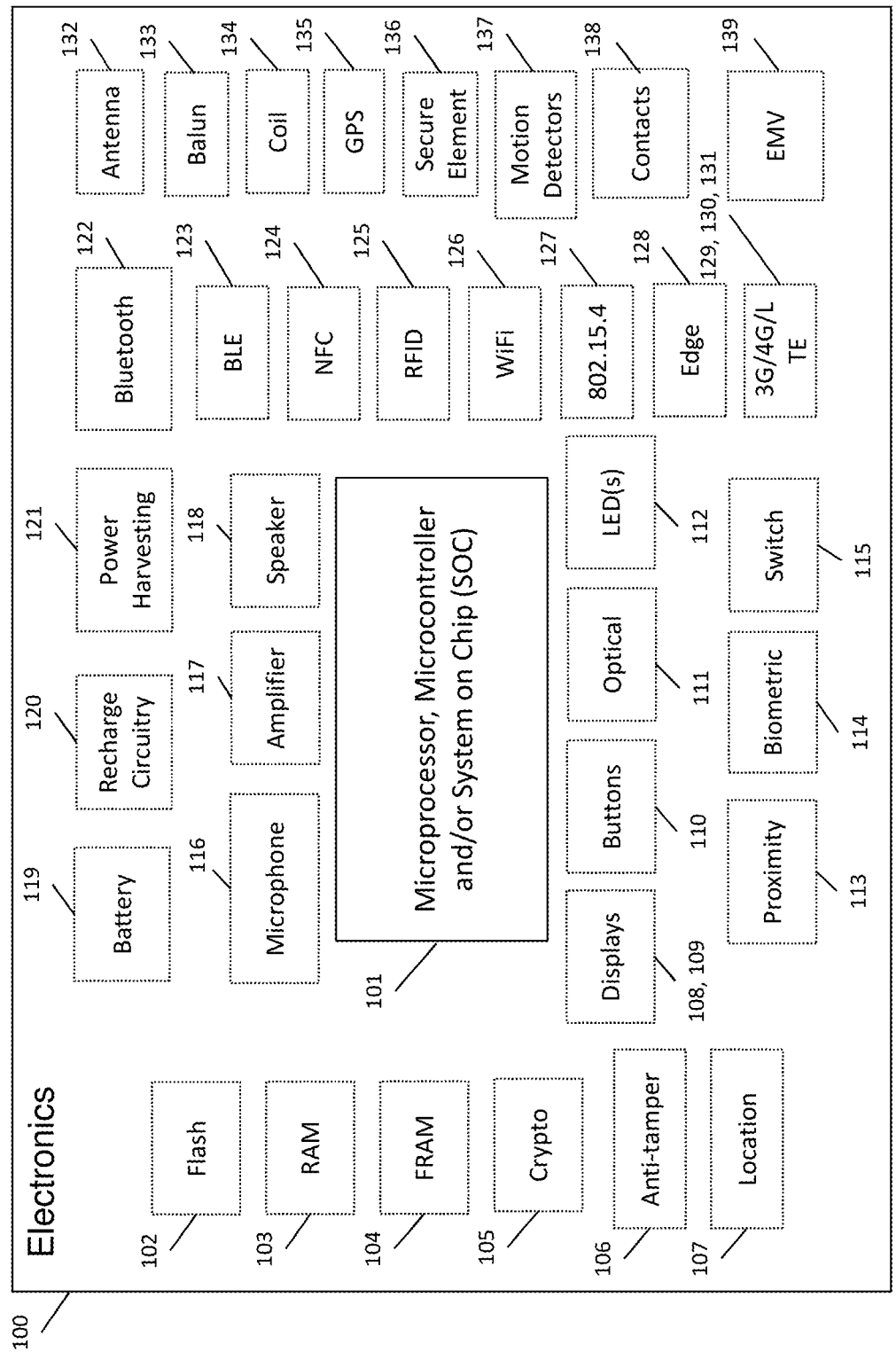
FIG. 8 illustrates components of a computer.

COMPONENTS OF A DEVICE/COMPUTER: In various embodiments, a user device (or any other device associated with the embodiments of the present invention) may contain one or more of the following components (or the following capabilities) within electronics 100 as shown in FIG. 8: a microprocessor, microcontroller and/or System on Chip (SOC) 101, memory (flash 102, RAM 103, and/or FRAM 104), crypto devices 105, anti-tamper devices 106, location devices 107 such as but not limited to GPS 134, displays 108, semi or fully transparent touch displays 109, buttons 110, optical sensors 111 and/or other interface controls such as but not limited to infrared, photodiodes, and/or image sensors, LED (Light Emitting Diodes) 112, proximity sensors 113, biometric sensors 114 such as but not limited to finger, heartbeat, face, IRIS and voice sensors, switches 115, microphone 116, amplifier 117, speaker, vibration or other devices that may provide haptic feedback per user interaction 118, battery, super capacitor, or equivalent power source 119, wireless battery recharging circuitry 120, power harvesting sensors and circuitry 121 and various interfaces including but not limited to Bluetooth 122, BLE (Bluetooth Low Energy) 123, NFC (Near Field Communications) 124, RFID 125, PAN (Personal Area Network), Wi-Fi 126, communications devices operating according to the specification 801.15.4 127, Edge devices 128, 3G devices 129, 4G devices 130, LTE devices 170, antennas 132, balun 133 and/or tuning networks, coils 134, GPS (Global Positioning System) 135, secure element 136, accelerometer or equivalent motion detection devices 137, physical contacts 138 such as EMV-8, EMV-6 or equivalent 138, or virtually any other electronic component. Other non-limiting examples include electronics that utilize displays 108, touch panels or touch screens 109, buttons 110, speakers 118, microphones 116, image sensors 111 and other sensors as interfaces to a user, and/or combinations of any electronics.

Batteries 119 may include but are not limited to lithium-ion, lithium polymer, super capacitor, rechargeable, primary chemistries and the like, and may also be thin enough to fit into extremely thin products such as a smart card 13 as shown in FIG. 7.

Figure 9:
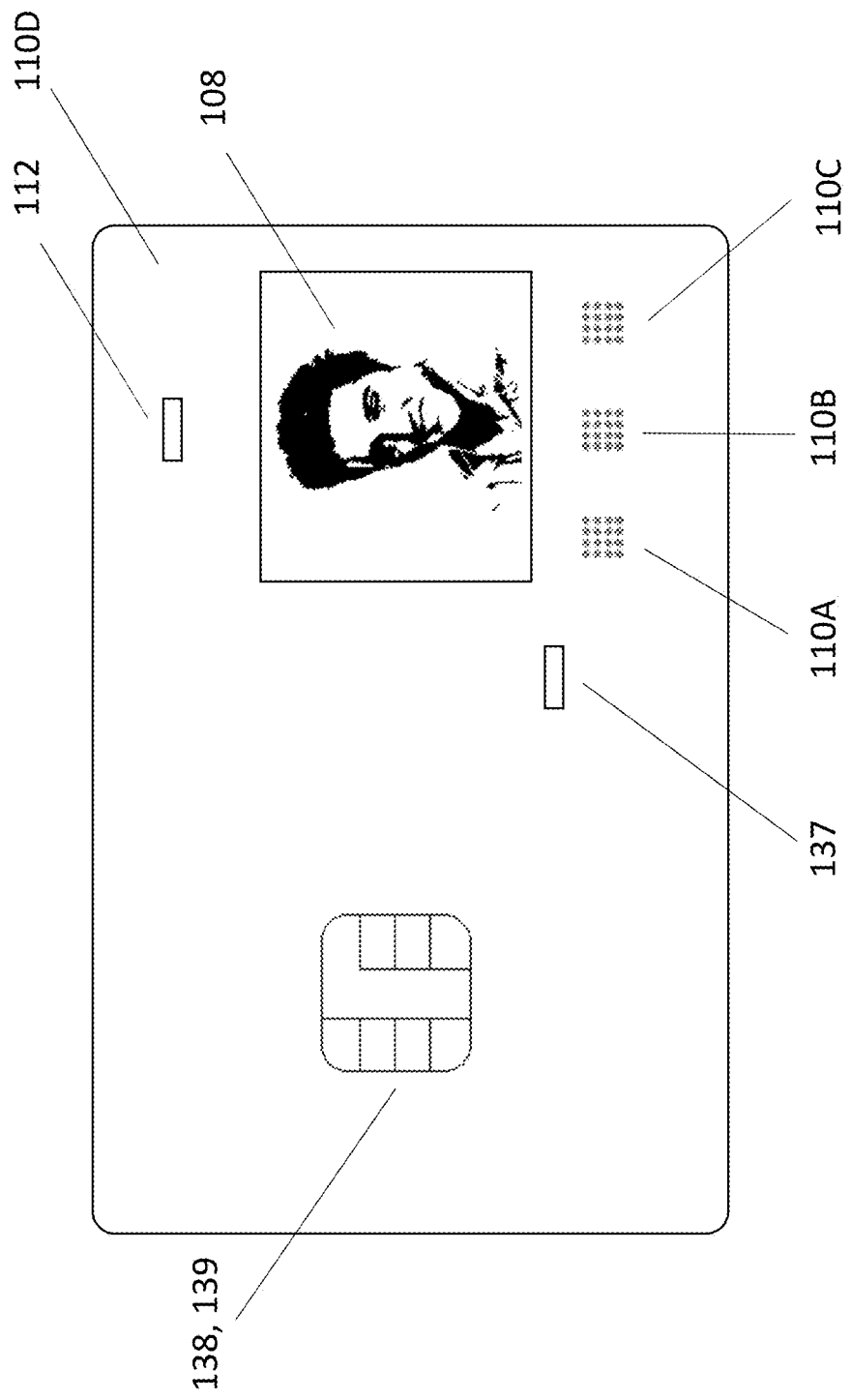
FIGS. 9-11 illustrate EMV cards.

DESCRIPTION OF CARD: With reference to FIG. 9, a card comprises displays 108, including but are not limited to LCD (Liquid Crystal Display), OLED (Organic Light-Emitting Diode), or other thin displays such as but not limited to e-paper, o-paper, bi-stable displays 108 and the like and/or LEDs. The display(s), which may provide notifications or feedback to a user or to other devices, must be thin enough to fit into extremely thin products such as a smart card as shown. Other components of the card include physical contacts 138 and/or EMV contacts 139, an accelerometer, a gyroscope, a magnetometer or other motion-detection devices 137. The card also includes buttons or controls 110A, 110B, and 110C, or hidden buttons or controls 110D that could be used for a variety of purposes including but not limited user interface controls to changing data and imagery displayed. User interface controls could include tapping, multiple taps, tap and hold for a period of time, or swiping across the button areas, but the buttons may be capacitive, resistive, or simply copper pads under the laminate of the smart card.

Figure 10:
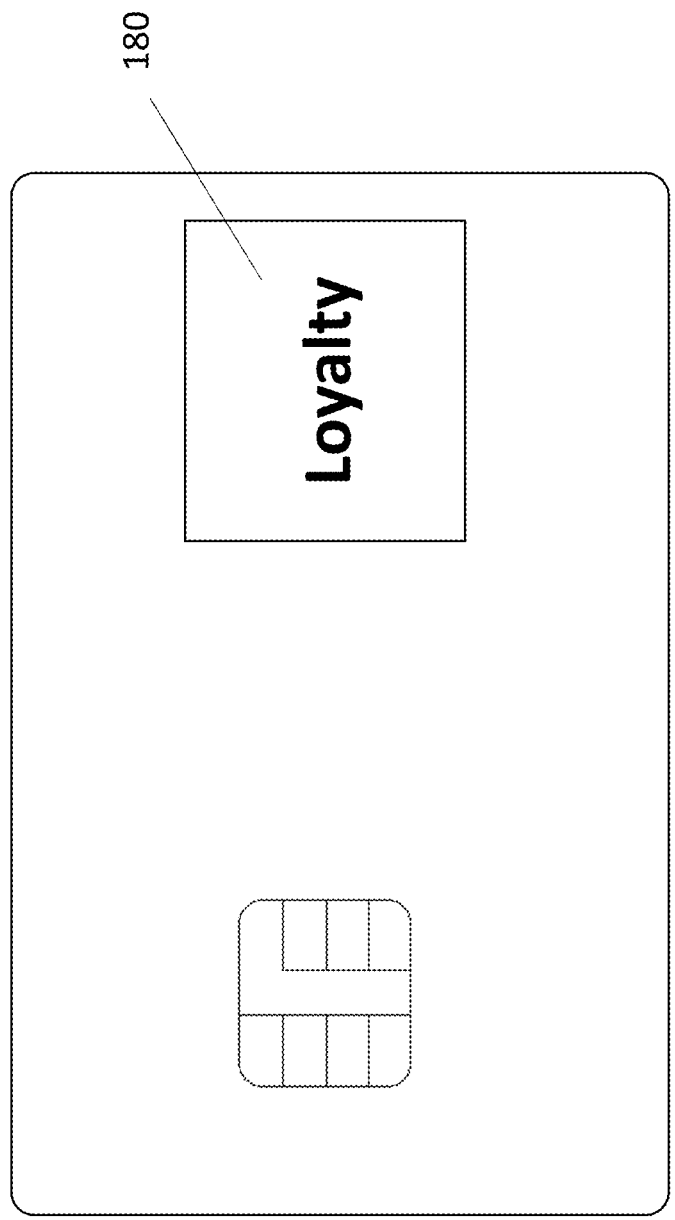

EXEMPLARY CARD: Cards such as illustrated in FIG. 9 can be used for a variety of purposes. For example, data that can be displayed related to categories of information as shown in FIG. 10, such as a "Loyalty" 180. Categories may be fixed, or in some embodiments, configured by the user via a software application or another interface local or remote to the device.

Figure 11:
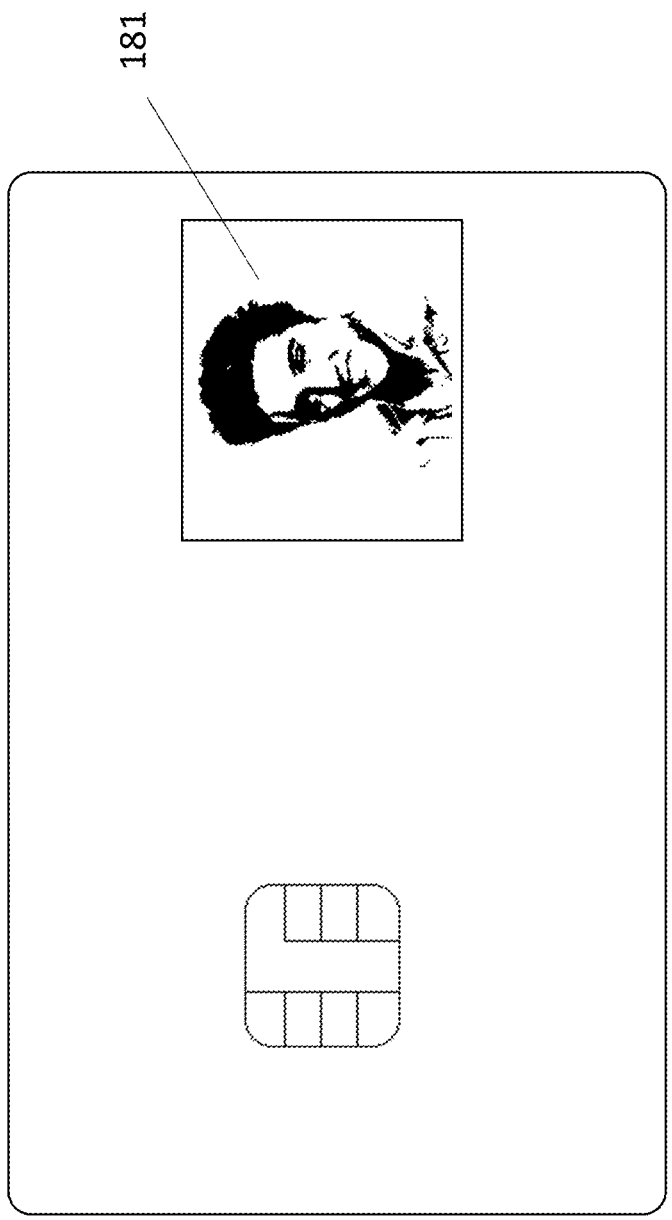

Other non-limiting examples of data that can be displayed includes identification data such as a picture 181 of a face as shown in FIG. 11. Other data (not shown in a figure) can include emergency or contact data (such as address and phone number), financial data (such as payment and/or account information), reward data (such as points), loyalty data such as company name, a bar code or a QR code, information as to proximate institutions/stores, etc. (such as store name), branding information, card issuing party, signatures, alias information that represents some data, account or information (such as "My Visa #1" card), emergency information (such as name, phone number, addresses, medical and allergy conditions and the like), medical information such as conditions, medicines and the like, receipts, advertisement data (such as discounts, sales, and coupons and the like), subway, train and other transportation related tickets or tokens, account information, authentication data (such as credentials), check-in data, and accounting and/or budget data.

In addition to displaying data, data may also be sent or received over communications networks with other devices as shown in FIG. 3, supporting personalized services to wake-up, automate and secure data to make user transactions more convenient.

REDUCING COMPONENT COUNT BY COMBINING FUNCTIONS: In one embodiment of the invention, the component count (on a card, for example) is minimized to simplify the electronics, which decreases cost and power. Communications techniques including RFID (Radio Frequency Identification) and NFC (Near Field Communication), are used to reduce chip count. These circuits may be powered, for example, by harvesting power from the RF signals or NFC signals at the reader (a transmitter at the frequency of the circuitry of the device).

In keeping with this minimalist approach, one embodiment consists of a simple BLE (Bluetooth Low Energy) circuit that enables applications such as but not limited to identification, preferences, payments, rewards, loyalty, advertisement, entertainment and geo-location. These embodiments can be within the form factor of any of the devices described above, such as but not limited to smart cards, smart bands, jewelry, wearable devices, any relatively small electronic devices, and the like.

Figure 12:
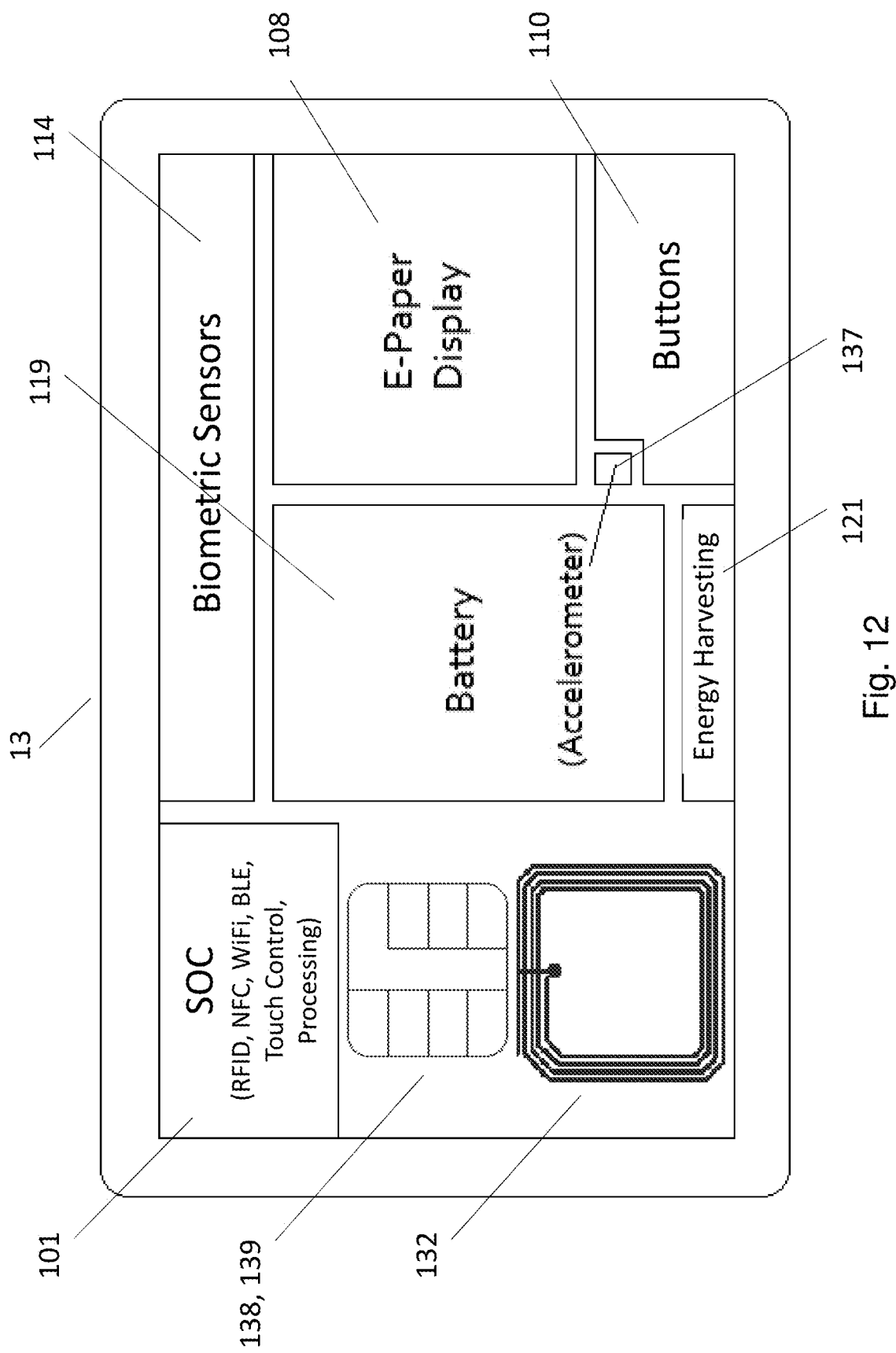
FIG. 12 illustrates internal components of an EMV card.

BLE AND NFC COMBINED: In another embodiment, BLE and NFC features may be combined onto the same device, such as a smart card 13 of FIG. 7 as a non-limiting example. Certain components may serve dual purposes to reduce chip count, complexity, power and cost. Component count may be reduced further by combining functions, such as but not limited to combining RFID, NFC, WiFi, Bluetooth or BLE, touch control, processing and other features on the same SOC (System on Chip) 101 of FIG. 12. ASIC (Application Specific Integrated Circuit) may also be included. Other non-limiting components, such as a display 108, physical contacts 138, accelerometers 137, antenna 132, batteries 119, and buttons 110, biometric sensors 114, and power harvesting devices 121 are shown in FIG. 12.

IOT STAMP: Combining BLE and NFC onto the same SOC or ASIC enables further reduction to form a tiny electronic system, such as for an IoT device. The NFC, BLE and Wi-Mag antennas may be combined into a single multipurpose antenna controlled by different GPIO and antenna interfaces on the SOC or ASIC. This multi-purpose architecture requires some isolation and impedance matching/balancing between RF and GPIO interfaces to protect internal circuitry while a different function is performed. Such features are described in more detail in the co-owned patent application, entitled Accordion Antenna Structure, filed on Apr. 4, 2016 and assigned application Ser. No. 15/089,844, which is incorporated herein in its entirety.

Using other techniques, such as wire-bonding, the aforementioned features (especially as used for IOT devices) can be further combined into a thin, small integrated module form factor roughly the size of a postage stamp. Furthermore, these features may be combined to fit under contacts such as EMV contacts. This approach achieves a miniature IOT stamp that supports BLE, NFC, Wi-Mag (wireless magnetic transmission), multiple payment types and multiple communication methods, close proximity detection, low power touch sensing, power harvesting, and motion activation to support ultra-low power IOT, distributed and/or personalize services.

In some embodiments, this miniature integrated IOT module or stamp may be utilized within other electronic products such as wearable technologies, while in other embodiments, the module may be inserted as a complete module into a smart card to simplify manufacturing of the smart card. The IOT stamp may also be configured to be inserted into other electronic devices, such as but not limited to smart cards, watches, bands and the like, using tiny contacts that engage a circuit board or flex circuit to integrate with other features within the electronic device. Under this configuration, a small o-ring like device or epoxy or glue may be used to waterproof and keep the connection stable.

SMART CARD TOUCH PADS: Touch pads may be used for to authenticate a user noting the manner and direction of tapping and swiping over touch sensors. See commonly-owed patent application entitled Methods and Systems Related to Multi-Factor Multi-Dimensional Hidden Security PINS, filed on Jul. 30, 2015 and assigned application No. 62/198,817, which is incorporated herein in its entirety.

Training could be performed on the user device, or securely communicated to another device to perform the training. For a non-limiting example, a user may configure his or her PIN by any combination of tapping a smart card by tapping short twice, long once, and swiping three times left and 3 times down, as a non-limiting example.

Another method to authenticate relates to card position detection while authenticating. This detection can be performed by an accelerometer or equivalent. For a non-limiting example, the pattern of how a user device is held could be recognized such as holding the card horizontally, then vertically, then horizontally, then along the "Z" axis (out of the plane). The algorithm may be enhanced by the amount of time the user's finger is held in each position.

POSITION PIN To add more security, the position of the card may be selected as a user taps or swipes as previously discussed. Under this method, a user may move the card in a certain pattern. As a user moves the card, the direction, speed, and duration of the movement of the card is characterized so that if it repeated, it is recognized.

BEHAVIOR-METRIC DESCRIPTION: Various parameters may be recognized as a user taps and swipes one or more touch or proximity sensors, such as but not limited to direction, pattern, speed, duration, surface area, and pressure of depression These parameters may be used to characterize the individual's behavior, not just the actual PIN. Certain behavior metrics are described in a commonly-owned patent application entitled, Biometric, Behavioral-Metric Knowledge-Metric and Electronic-Metric Directed Authentication and Transaction Method and System filed on Jul. 5, 2016 and assigned application Ser. No. 15/202,515, which is incorporated herein in its entirety.

CLOSE-PROXIMITY AUTHENTICATION: The user device may also be authenticated by its close proximity to another authenticated device such as a phone, tablet, computer, laptop and the like; wearable such as but not limited to wallet, keychain, jewelry, watch, band or the like; other smart cards or combinations.

Authentication may also be performed by another device, such as but not limited to a phone, that passes credentials to the user device that the user device recognizes and authenticates. This could be a single authentication code or event, or require negotiation between the two devices to confirm authentication. For instance, a user could authenticate using a biometric such as voice, face, fingerprint or other method from another device, such as but not limited to a phone, which then negotiates with the user device to authenticate.

Other types of authentication may also be supported, in some embodiments including but not limited to biometrics such as but not limited to voice, face, IRIS, scent, thought and Finger. For voice, a microphone or other acoustic device may be onboard the user device. Other biometric methods that may be utilized include heartbeat, face, IRIS, eye, finger, scent and the like. Any of these and other biometric and/or behavior metrics may also be used for authentication and account/information selection, or both, via another devices, such as but not limited to a phone, to authenticate with the user device and direct a payment.

MOVEMENT FOR CONTROLS (WITHIN THE CARD): Movement of the user device or a smart card may also be used for other applications including but not limited to controls. For a non-limiting example, movement of the card such as rotating to the left or right in a quick fashion could act as a left/right scroll through information contained on the card or contained on a display screen, for example. Motion in one direction, such as the forward direction, can select a specific information element such as but not limited to a payment card selected for payment. Other movements could be used for various other features including but not limited to menu display, selection from screen text or icon, category scrolling, feature selection; audio and video controls, changing thermostat temperature or changing lighting effects, etc.

HAPTIC FEEDBACK (IN A DEVICE OR CARD): Haptic feedback, such as a speaker, vibration method, buzzer or other method that provides feedback of a gesture back to the user.

MULTI-EMV—ENERGY HARVESTING, COMMS, TOUCH, PAYMENT: In addition to supporting payment transactions over the physical contacts of EMV 138 including but not limited to transactions that conform to ISO 7816, this invention also introduces the concept of using EMV contacts to support other features such as but not limited to energy harvesting, communications and/or a touch sensor 138 within a small area on a device, such as but not limited to a smart card 13 as shown in FIG. 12. Repurposing of the EMV contacts to support power harvesting, communication, wake-up, touch sensor as well as EMV payments is unique and non-obvious, given it enables multiple features within a small area that is already available on typical payment cards used today.

Under some embodiments, power may be harvested from a variety of methods including but not limited to power harvesting from NFC (a method that harvests power from 13.56 MHz from Near Field Communication transmission), Bluetooth, WiFi or other radio frequencies (RF), piezo, solar, acoustic and RF (Radio Frequency) energy sources, collectively called "energy harvesting" methods hereafter.

Figure 13:
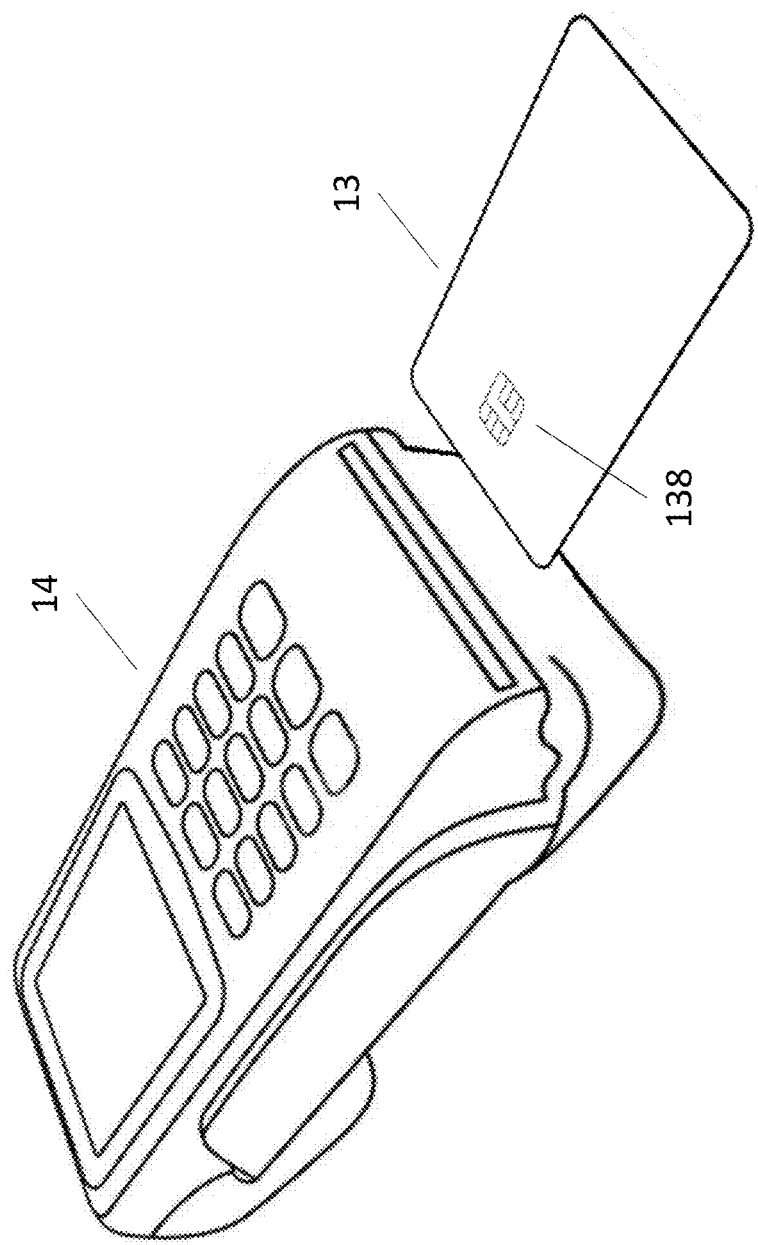
FIG. 13 illustrates an EMV card and a card reader.
Figure 14:
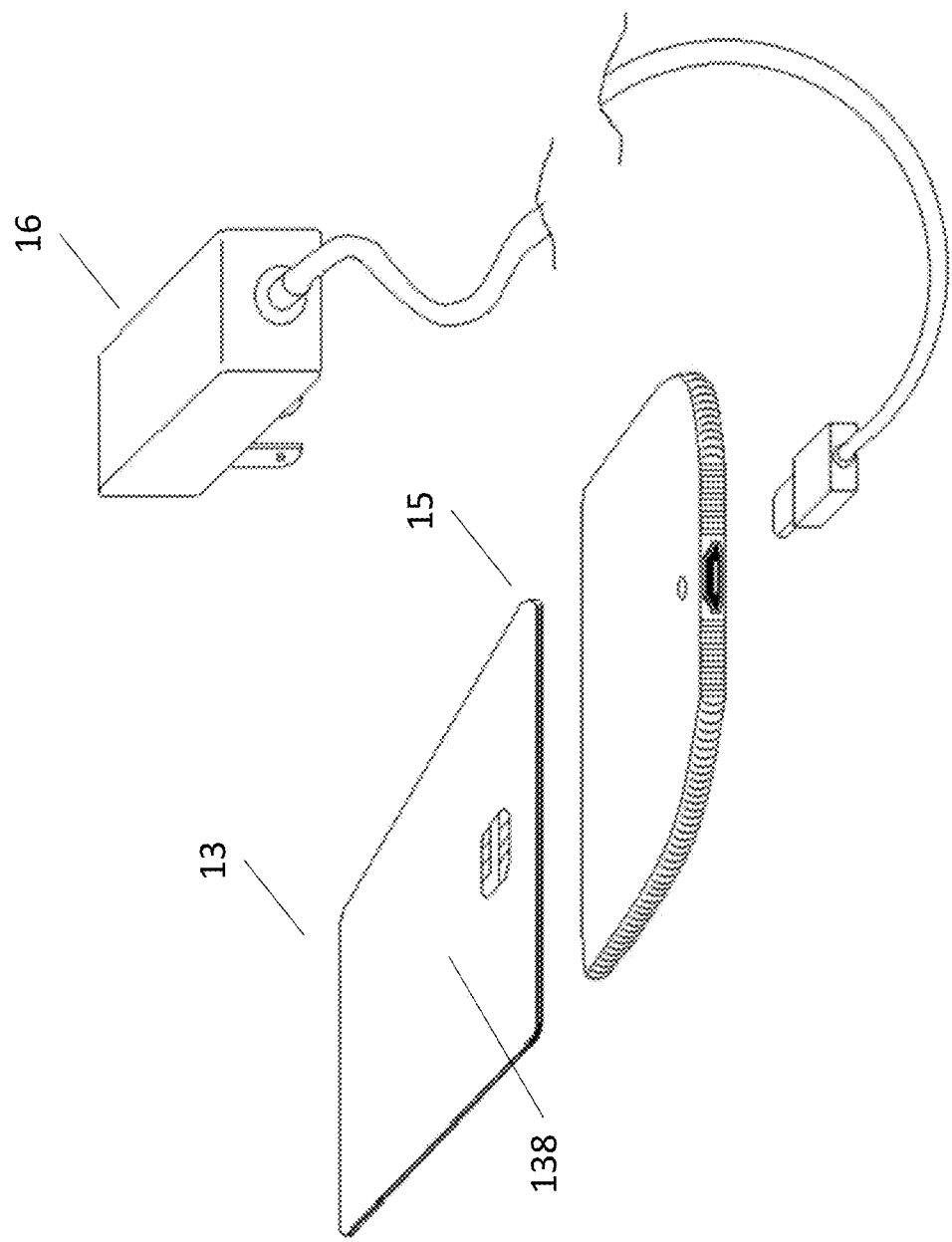
FIGS. 14 and 15 illustrate charging an EMV card.
Figure 15:
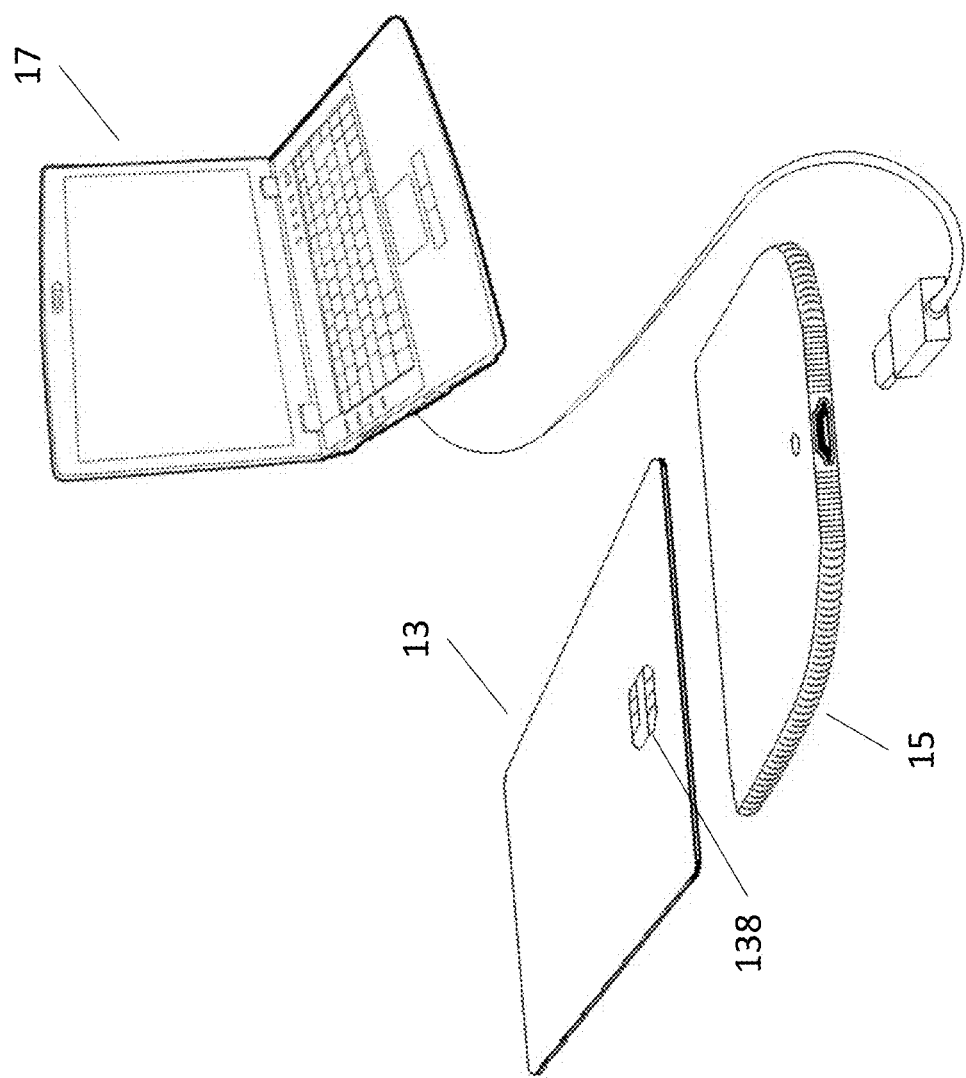
Figure 17:
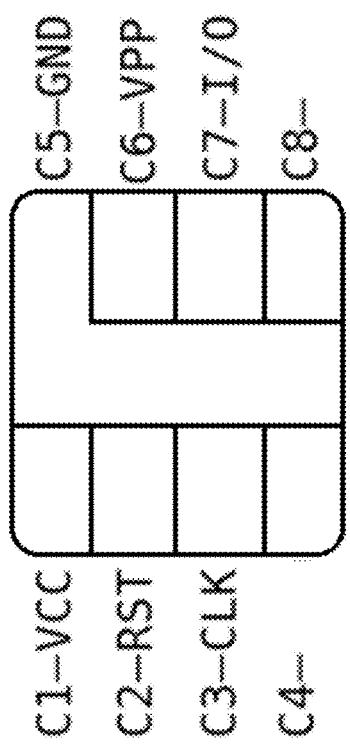
FIG. 17 illustrates EMV contacts.

Under this multi-purposing EMV aspect of the invention, energy may be harvested from physical contacts 138 of EMV (Euro Pay MasterCard Visa) contacts 139 typically found on most cards today. Under this invention, rechargeable power sources may be recharged from power harvested from energy harvesting methods previously described, such as but not limited collecting power from contacts 137 on a device such as but not limited to a smart card 13 that harvests power from EMV contacts 138 while inserted into an EMV reader 14 as shown in FIG. 13, or in some embodiments, while inserted into an EMV charging device 15 connected to a wall plug 15 as shown in FIG. 14 or connected to a laptop 17 as shown in FIG. 15. Since pin C1 (see FIG. 17) is always voltage, the voltage can be harvested from this pin as a card is used, charging a rechargeable battery within the card.

REPURPOSING EMV—COMMUNICATIONS: This multi-purpose EMV invention also supports a communication purpose for the EMV contacts. Under this invention, communications between two EMV cards may be established, for example by by detecting the presence of the other device. Under this embodiment, the card detects a non-payment device or card, for example, through a variety of means including but not limited to voltage and/or non-voltage, and/or communications on one or more of the pins, achieved by toggling between voltage and receiving communications or just receiving communications over a single pin after interrupt.

Figure 16:
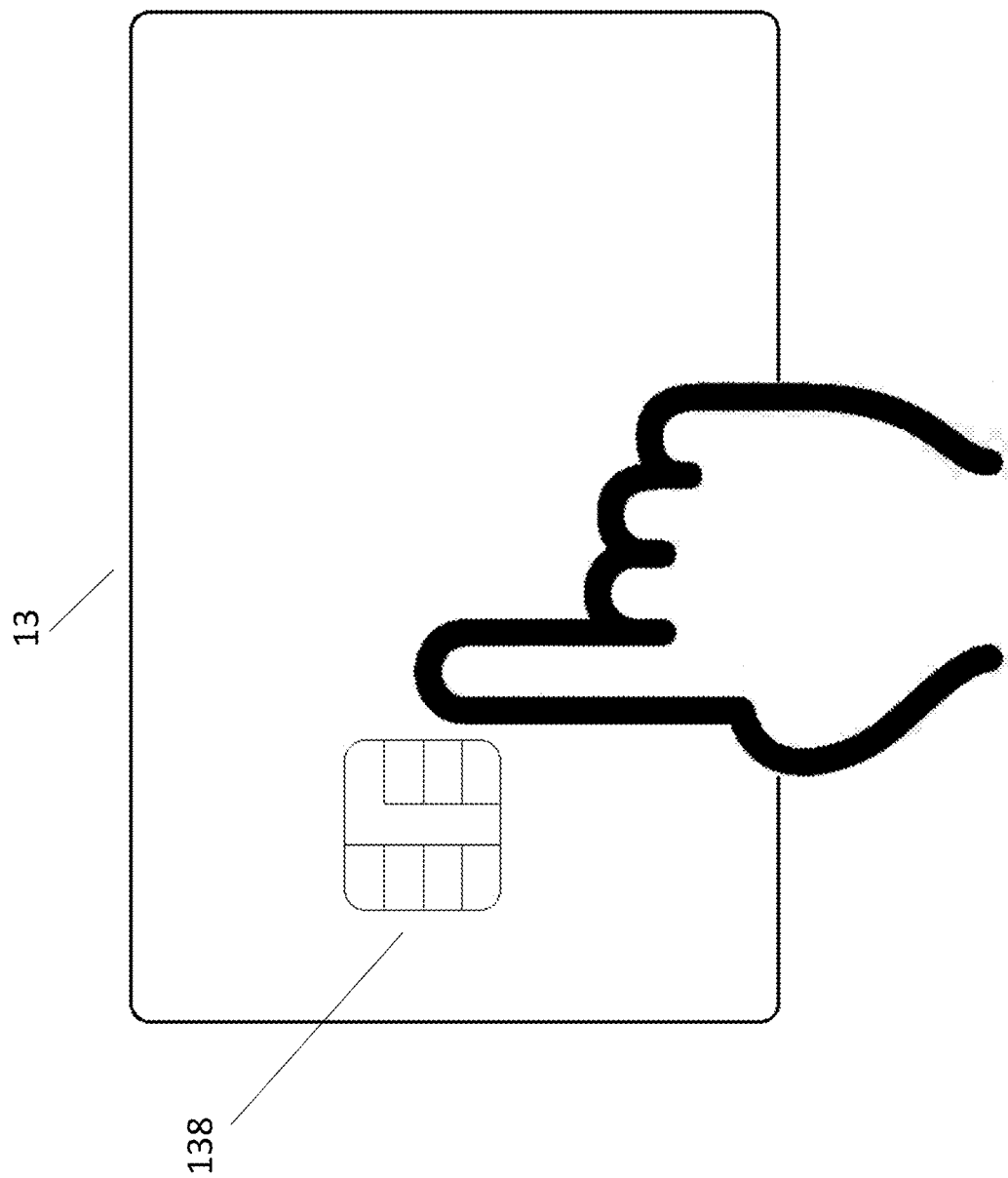
FIG. 16 illustrates a swiping action using an EMV card.

By connecting EMV to interfaces on a microprocessor that then connects to a secure element, or that is the secure element in some embodiments, the EMV contacts may be then utilized as an alternative communication path and/or touch sensor. This architecture described in FIG. 16 illustrates how multiple functions may be supported by using a microprocessor to reconfigure connections such as GPIO (general purpose input output) to support multiple purposes including but not limited to communications, wake-up and touch interfaces.

Connecting to a USB device achieves communication with EMV contacts on a user device, such as but not limited to a smart card, which is a unique method to perform services with faster data rates than slower interfaces such as BLE. This is particularly advantageous for remote updates and other communications that require large amounts of data. Thus, in some embodiments, communications to and from the user device, such as a smart card, can be performed via wireless interfaces, such as but not limited to WiFi or Bluetooth, while in other embodiments, via physical interfaces such as but not limited to USB and/or EMV contacts, or in still other embodiments, combinations of physical and wireless communications.

REPURPOSING EMV—MULTIPLE COMMUNICATIONS TECHNIQUES: This method increases security by requiring two interfaces, as well as increases the speed of certain services that may require larger bandwidth or data size such as but not limited to remote software or firmware updates. Unlike previous art that communicates between a phone and a card purely over Bluetooth, this method enables communications over the EMV contacts for non-payment devices, or combinations of Bluetooth, WiFi, NFC, Magnetic Stripe, display, in some embodiments. For a non-limiting example, the user could control the configuration of the user device via Bluetooth.

For applications that require more secure communications such as but not limited to programming a user device with payment or other information, data can be sent over two or more communications channels, such as Bluetooth and EMV, and/or encrypted over both channels. In the same way, authentication for certain tasks could require multiple communication channels where portions of the authentication/Negotiation are passed over multiple channels.

MULTI-EMV—TOUCH: In the embodiment that includes a motion detection method to wake-up the circuit, the circuit that may be set to send a beacon or communication signal, or may also set a processor or equivalent controller in a low power state that waits for another trigger. In some embodiments, that trigger may include but not be limited to one or more touch sensors. Under one embodiment, EMV contacts may be repurposed to act as touch sensors as well.

DESCRIPTION OF EMV TOUCH—LOW POWER WAKE-UP METHOD One such low-power touch sensor utilizes two or more pins to send an interrupt to wake-up the circuitry. Most microprocessors have an ultra low power state or "deep sleep" state where the core processor is turned off to conserve power, but peripheral devices are maintained. With such components, the processor and/or other circuitry can be held at an extremely low power state while keeping a voltage on one or more pins or pads of the processor. Likewise, one or more other pins or pads of the processor can be configured as interrupts, which can be triggers when a user touches across one or more pins held at a voltage and one or more pins configured as interrupts. This method may also be applied to circuitry without use of the microprocessor to further conserve power utilizing a series of FETs or equivalent to short across two or more pins and thus, wake-up the FET to turn on and hold the circuit in a powered state. One or more microprocessors may then turn off the circuit by resetting the FET, effectively turning itself and the entire circuit off. This method may be referred to as "Ultra-Low Power Sensing (ULPS) herein.

ULPS low-power wake-up innovation enables a number of embodiments, including the re-use of a standard EMV contact on a payment card. Typically, the contacts on an EMC card are exposed in order to enable payments via EMV, frequently called "contact" payments, chip-and-signature or "chip-and-pin". Under this invention, these EMV contacts on card may be repurposed to provide wake-up, touch interface, battery recharging and communications, as well as other features and functions.

Wake-up can be performed by the aforementioned low-power wake-up method where a microprocessor (or FET) may keep one or more pins high (with voltage), while sensing one or more other pins as interrupts. Thus, under this embodiment, a user may wake-up all or a portion of circuitry by tapping and/or swiping the EMV contacts. This may be performed as a simple stand-alone wake-up, or in combination with other wake-ups such as accelerometers, capacitive, infrared and/or other touch or proximity sensors, as non-limiting examples.

EMV TOUCH: EMV contacts may also be used as a touch sensor by applying this same method. As shown in FIG. 16 EMV contacts may be used as a touch sensor as well. Functions associated with the EMV contacts may include short, medium and long taps; double and triple taps, and swipes left, right, up or down or a combination of these motions. Swiping is achieved by using more than one pair of clever sense touch pins to help identify direction. The advantage of this method is that interrupts are the fastest sampling a microprocessor can perform. Thus, under such embodiments that utilize clever sense for EMV, EMV contacts on a card may be used to provide very high accuracy with lower rejection or false swipes than other touch methods, especially at extremely low power operation.

EMV-6 (i.e., six contacts) may be used, but EMV-8 provides better accuracy for detection of swiping since it may utilize three pairs of contacts. Two pins of EMV-8 are reserved for voltage and ground, while the other six are available for various functions such as VPP, CLK, Reset, I/O, and the like. By connecting the pins to a microprocessor, these pins may be repurposed to act as touch sensors. See FIG. 17.

Under such embodiments, some pins are configured with a voltage while other pins are configured as interrupts (sensors). The pins may be configured in alternating patterns. As a user swipes from left to right, one or more of the interrupts is triggered by the finger touching across the interrupt and a voltage pin. As the $2^{nd}$ column of pins (also referred to as pads, contacts, terminals controls) on the right is touched, interrupts on one or more pins on the right row are detected, indicating a swipe right. Conversely, a right to left swipe may be detected in the same way, by detecting one or more interrupts on the right before detecting one or more interrupts on the right.

In the same manner, the direction of up and down swipes may be detected by the order which the interrupts are detected. Up and down are differentiated from left to right by the order of interrupts detected in time, and where two interrupts are detected simultaneously on one side versus another. Taps are calculated by all interrupts being detected simultaneously within a threshold.

REPURPOSING EMV—MULTI-TOKENIZATION: EMV may also be multi-purposed for more than one tokenization. For standard EMV, the contacts are used to pass a token. The interface to the contacts is dictated by ISO 7816. Tokens are generated by the issuer via an applet on a secure element or over the cloud using host card emulation (HCE), whereby the token may be downloaded from a remote server, or combinations of the two.

All of the multi-purpose uses of the EMV will not impact the primary purpose of EMV, which is to perform payment. A payment terminal is detected as dictated by EMV and payment tokens are passed accordingly according to conventional operation of the EMV card.

EXAMPLES OF PERSONAL SERVICES: This invention brings the personalization of service found at high-end hotels, resorts and hotels such as but not limited to Ritz hotels to every day establishments by offering speed and convenience, as well as security and utility. Personalized services supporting inter-communications between devices enable a plethora of applications. A device could be considered to enable shopping, advertisement, identification, entertainment, security, hospitality, dining, payment, rewards, loyalty, travel, accommodations, room keys, location driven multi-media capture (such as events or activities like at a resort or ski lift) and other applications, markets or industries that facilitate personalized service, as non-limiting examples.

DEFINITION OF ESTABLISHMENTS: Establishments may include but not be limited to restaurants, hotels, retail, vendors, stores, security, casinos, theaters, entertainment, businesses and other entities, and the like, collectively called "establishments" herein. Communications may be transmitted by the user device, the establishment device, or both.

The various descriptions of personalized services herein are set forth as examples only and are not meant to be limiting.

Figure 18:
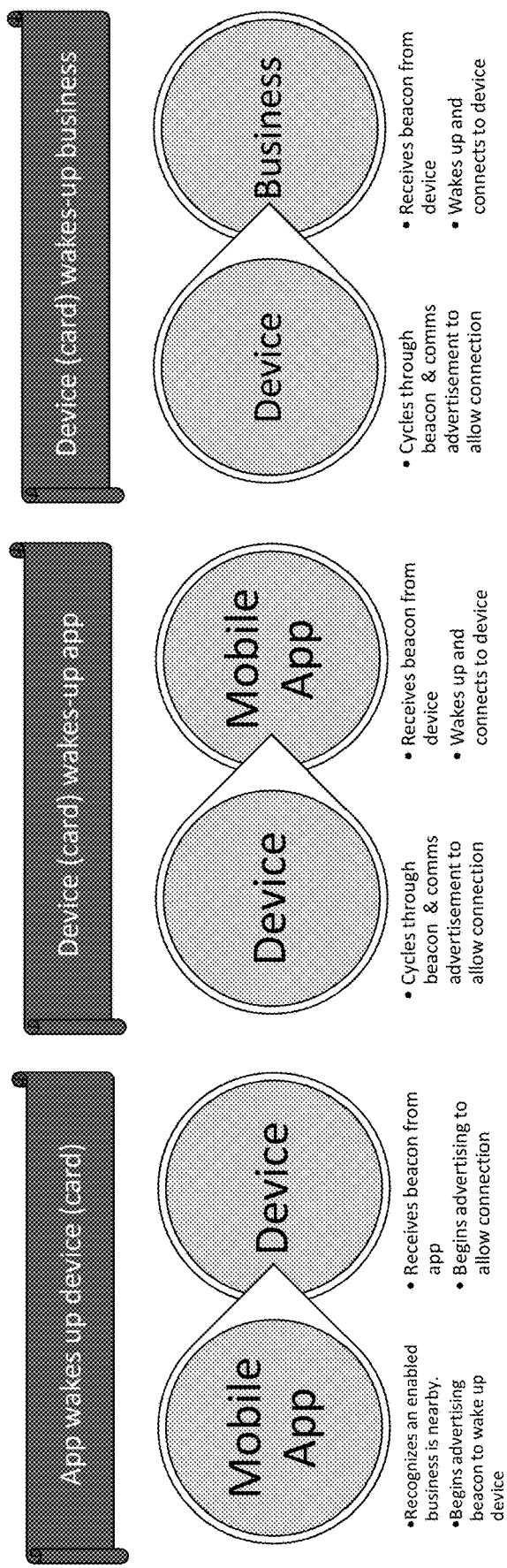
FIGS. 18-21 illustrate alternative embodiments for providing wake-up services.

SERVICE EXAMPLES, WAKE-UP: Three non-limiting examples of a "wake-up service" are illustrated in FIG. 18. One example illustrates an application on a mobile device recognizing a business is in close proximity, responds by sending advertisement packets to wake-up and invite another device to establish connection to communicate. Other examples illustrate application waking up a device (such as a card) and the device waking up the application.

Figure 19:
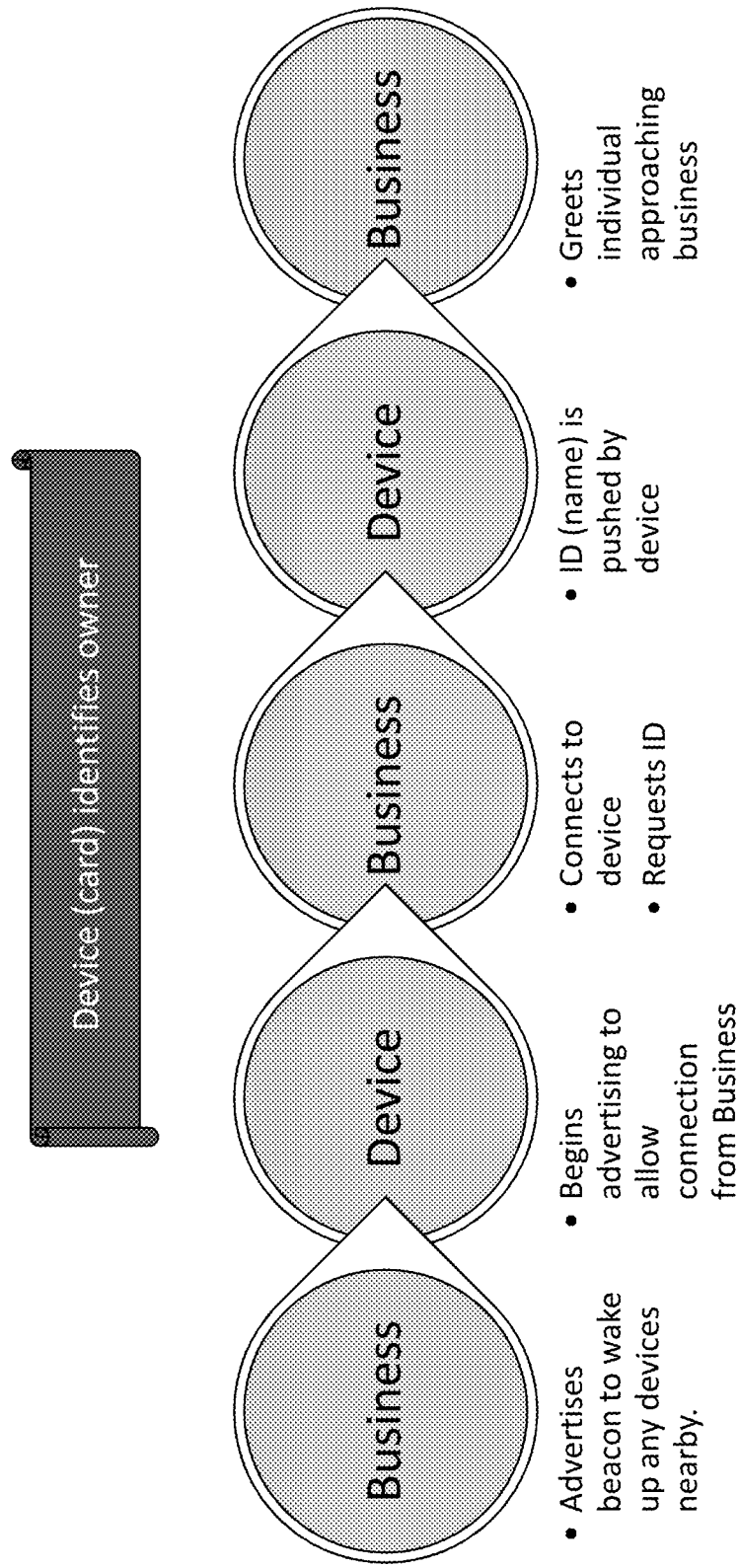

Another example in FIG. 19 shows a device cycling through beacon and communication advertisements to allow connection with a mobile application, which upon receipt of a wake-up, signal wakes-up and connects to the device to exchange information.

Figure 20:
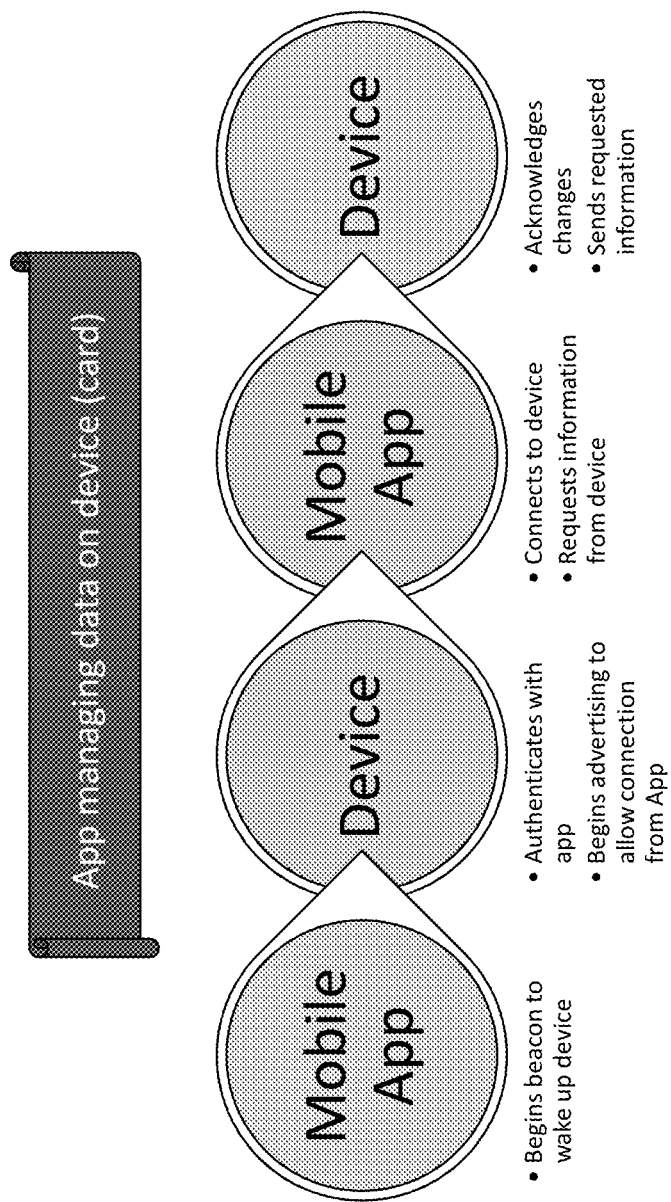

Yet another example in FIG. 20 illustrates a device sending a signal to a business, which upon receipt of the wake-up signal, wakes-up and connects to the device to exchange information.

Figure 21:
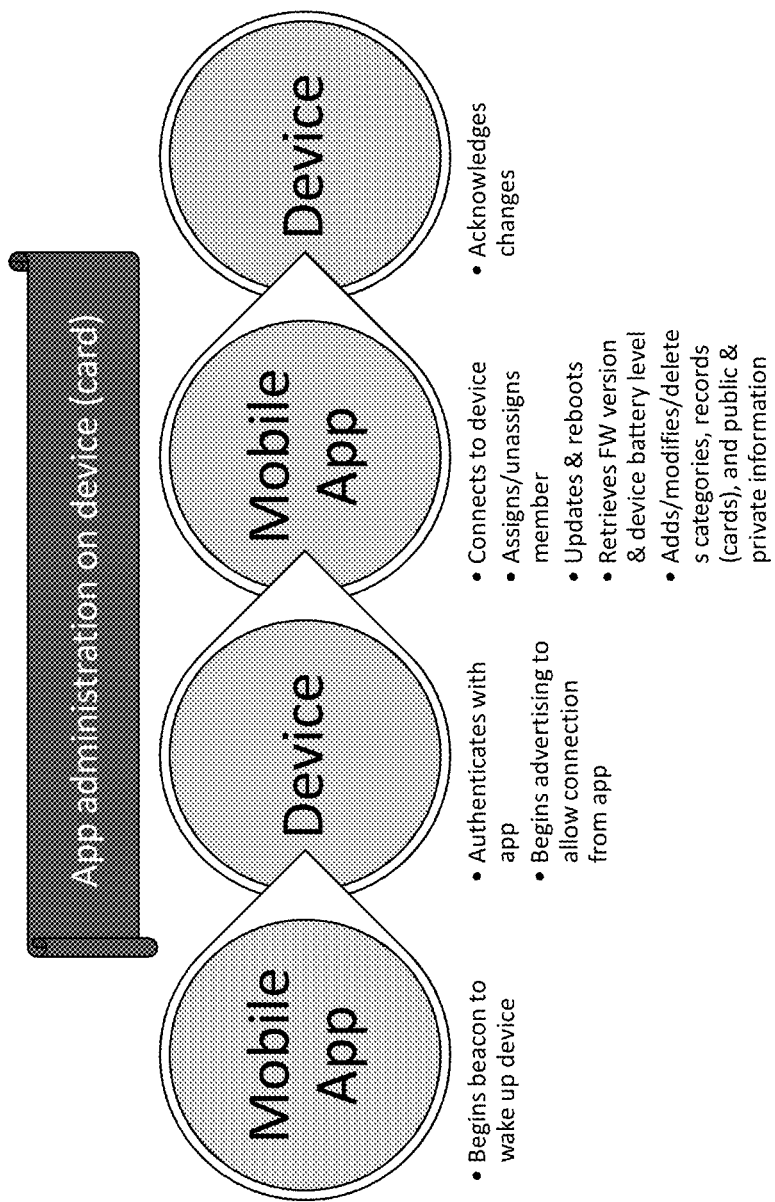

SERVICE EXAMPLES: PROXIMITY: FIG. 21 illustrates another non-limiting personalized service, whereby a first device periodically sends a beacon based upon some time interval and a mobile app sends an alert to the user if one or more devices do not respond within a time period, thereby achieving a "proximity service". Conversely, the app or one or more other devices could also periodically communicate with the first device whereby the device detects and alerts the user if a device is missing.

Beacon and/or communication intervals may be updated local to a first device, or from another device such as a mobile device. These intervals may also "adapt" to various activities such as that detected by a motion sensor. For instance, beacons and/or communications may be slower during sleeping that in walking or daily activity, for example. This adaptive transmission method conserves power as previously described herein.

PICTURE TRACKER: Another example of an application that utilizes a proximity service is a picture tracker, where a picture or video/audio taken on entertainment activities such as but not limited to amusement parks, resorts, ski slopes, rides, theme parks and the like is linked to a beacon that identifies the user whose picture was taken. In this embodiment, a device that controls the picture taking could also communicate with another device to automatically download an identifier of the picture (such as ride and number, locale, etc.), the time of the picture, or the picture itself.

PERSONALIZED MOTION SERVICES: Another example of a personalized service includes data collection of movements by a user. A smart card, for example, with an accelerometer or other motion sensor embedded could collect movements of a user. In this embodiment, the device (smart card in this example), could be used as a step counter, pedometer or mileage tracker. Another service that may leverage motion detection include fall detection, where the identity of an individual is sent via communications methods previously described to alert authorities that a fall has taken place.

DATA MINING—WHAT USER LOOKED AT: Proximity service may also be used to perform data mining. A good example is determining what a user looked at in a store by detecting the user identity and the location the user stood, and the time the user stood at that location using proximity beacons and RFID or Bluetooth BLE or the like.

Figure 22:
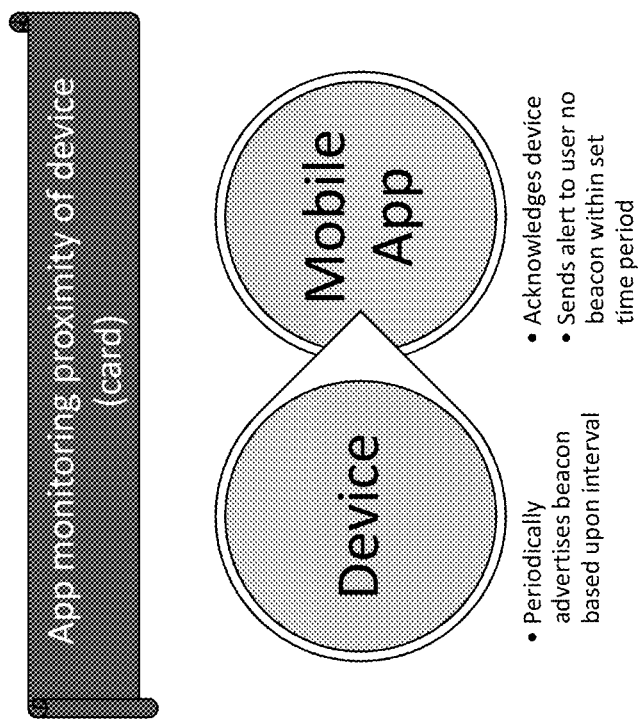
FIG. 22 illustrates proximity detection between two devices.

For embodiments that include Bluetooth or WiFi, one device may detect the absence of another device. For instance, a phone could detect that a smart card is missing based on lack of response over Bluetooth or WiFi over a period time. Likewise, a key-chain may detect the absence of both a phone and smart card. This mutual proximity method provides a simple secure mechanism that could also be used to send an alarm, or indicator, to alert the user of the absence of one or more of the other devices via one of the devices, or in some embodiments, to locate one or more of the other devices. See FIG. 22.

Devices may be located using a variety of means not limited to Bluetooth power measurements, TDOA (Time Difference of Arrival), RFDOA (Radio Frequency Difference of Arrival), triangulation (where two or more devices triangulate with one or more other devices), or in some embodiments, GPS (Global Positioning System, which uses satellites to locate one or more devices) or other geolocation methods.

Figure 23:
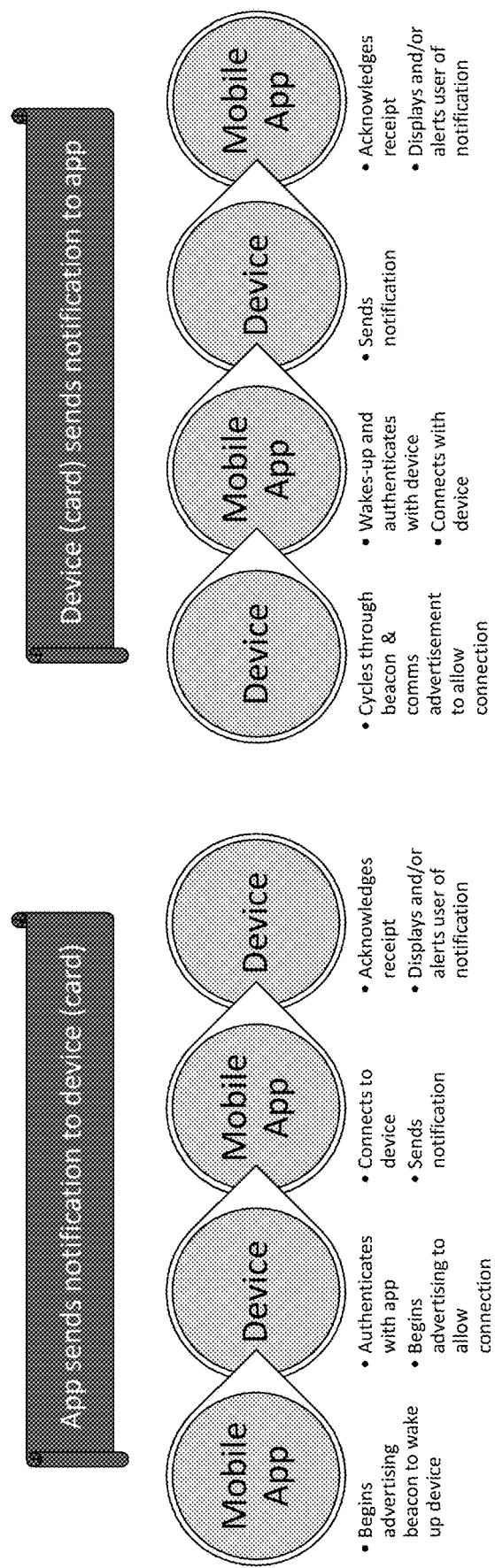
FIG. 23 illustrates an information providing service.

SERVICE EXAMPLES: INFORMATION: FIG. 23 shows a non-limiting example of a general "information service" whereby a mobile app sends a signal, such as but not limited to a beacon, to wake-up a device and/or share information such as but not limited to preferences. Upon receiving the wake-up signal, the device authenticates with the app and begins advertising via a communication advertisement such as using BLE. Upon connecting with the device, the app requests information from the device which then sends the requested information.

Other embodiments include but are not limited to devices sharing information once a device is aware of another device in close proximity, with or without wake-up or authentication and with or without the second device comprising an establishment. An information service may personalize the information such as contact or business card data, in one non-limiting embodiment, or medical records, car, house and medical insurance information, or virtually any information or data in other non-limiting embodiments. Under some embodiments, information is shared between two or more user devices, while in other embodiments one or more devices are associated with a business and/or establishment.

SERVICE EXAMPLES: IDENTIFICATION: According to this embodiment related to "identification services", one or more devices introduce themselves to one or more other devices as they come into close proximity with one another. According to this example, a first or second device advertises a wake-up signal to make the other device aware of its close proximity. With some embodiments, a second device may recognize a first device by the UUID (Universally Unique Identifier) within a beacon sent by the first device. In other embodiments, other identification information might be communicated including but not limited to one or more of a picture, a name, initials, biometrics, behavior-metrics, electronic-metrics, knowledge-metric, distinguishable characteristics, numbers and the like. Numbers could be social security, membership, identification, licenses, passports, visa, club, frequent flyer, reward, loyalty or virtually any number that may identify an individual.

Once received, an establishment may utilize the identification information to personalize various services such as but not limited to hospitality, advertisements, rewards, payments and the like.

SERVICE EXAMPLES: HOSPITALITY: In a simple non-limiting example of a personalized "hospitality service", a device associated with a business establishment may connect and request identification information from a user device, which then, upon receipt of identification data, an individual identifying the individual from the identification information greets the individual approaching the business establishment.

Other non-limiting examples that may utilize identification data or information include but are not limited to personalizing authentication, security, cryptographic (crypto), or tokenization services. One non-limiting example include use of these services to validate the identity at a payment terminal or a check-out line. Under this example, a picture or other identification or authentication data may be sent by a first user device to a second device associated with a retail or point-of-sale (PoS) terminal. Upon receipt of the identification or authentication information, an individual may compare the data to responses from an individual such as including answers to questions, picture of a face, or other distinguishable characteristics that could be used to identify or verify an individual is who he or she says he or she is. In some embodiments, the question, picture or other information could change for each transaction to improve security.

AUTHENTICATION SERVICE: Another non-limiting example is authentication services that are personalized based on biometric, behavior-metric, knowledge-metric, or electronic-metric information that is sent from one device to another device. Upon receipt of the data, an algorithm compares the information received from the device with information collected from the individual live to authenticate the individual.

Authentication may also be personalized in a variety of applications including security services such as access control, timecard management, and/or customization of credentials for logging into devices, computers, services, websites and/or applications. Under one embodiment, a personalized authentication service may detects a device, door, website, software and the like requiring credentials to provide the device and or user access. In some instances, the device (smart card for example) could generate and/or manage the credentials.

Under some embodiments, cryptographic services may be used to generate credentials per information provided by the user and/or the device to support dynamic codes that may be used for authentication. The concept of dynamic pairing is described and claimed in co-pending and commonly-owned application Ser. No. 14/217,202, entitled The Unpassword: Risk Aware End-to-End Multi-Factor Authentication via Dynamic Pairing and filed on Mar. 17, 2014, which is incorporated herein in its entirety.

In other embodiments tokenization services could be used to generate cryptographic messages, cryptograms or tokens that may be personalized responsive to information received by a user or device. In addition, multiple tokens may be personalized to improve security of transactions, authentication, and payments. Multi-tokenization and personalized tokenization is described further in the co-owned patent application entitled Personalized and Dynamic Tokenization Method and System, filed on Jul. 14, 2016 and assigned application Ser. No. 15/210,728, which is incorporated herein in its entirety.

SERVICE EXAMPLES: TOKENIZATION: For a non-limiting example, a first device, such as but not limited to a smart device such as a smart watch, smart band or smart card, could send a token responsive to information received from a user, or in some embodiments, another device. Tokens may be generated via cryptographic elements local to the first device, or in some embodiments, received from a second device such as but not limited to a cell phone. In yet other embodiments, a first device may connect to a remote tokenization service directly, or via a second device. A second device, a cell phone in this example, could communicate to a third device, a tokenization service in this example, via an application or software, or in some embodiments, the second device could be tethered to the internet to connect to the remote tokenization service.

MULTI-TOKENIZATION: Tokens and/or cryptograms may be generated by a variety of methods including but not limited to local generation such as EMV, HCE (host card emulation), and/or cloud-based tokenization services such as MasterCard, Visa, American Express and the like. The present invention supports Interfaces over which tokens and/or cryptograms may be directed include but are not limited to methods to transmit data to a magnetic stripe reader, such a wireless electromagnetic (Wi-mag) antenna, "direct contact" methods, including but not limited to a dynamic EMV chip), and/or an inductive coil. Other interfaces or forms of communication may include but are not limited to RFID (radio frequency identification), NFC (near field communication), BLE (Bluetooth® low energy), Bluetooth®, Wifi®, PAN (personal area network), 3G standards, 4G standards, Bar code, QR code, sound/acoustic and/or light.

Herein, one or more devices may be utilized to select an account, generate and/or transmit a token or cryptogram, and/or direct the payment to a payment interface and/or device. Devices that can be used to select, generate and direct payment include but are not limited to smart wallets, cellphones, tablets, smart watches, and/or any other mobile or wearable device, called "smart wallets" hereafter. Devices that can be used to make payment are called "payment devices" hereafter. Services that generate tokens and/or cryptograms are called "tokenization services" hereafter.

A user may direct a token using one or more inputs including but not limited to behavioral inputs, biometric inputs, and/or a PIN (personal identification number). Herein, behavioral inputs are some action that can be performed that uniquely identifies a user. Such inputs may include but are not limited to voice inputs, touch inputs, facial expressions, gestures, behaviors, drawings or the like.

Figure 24:
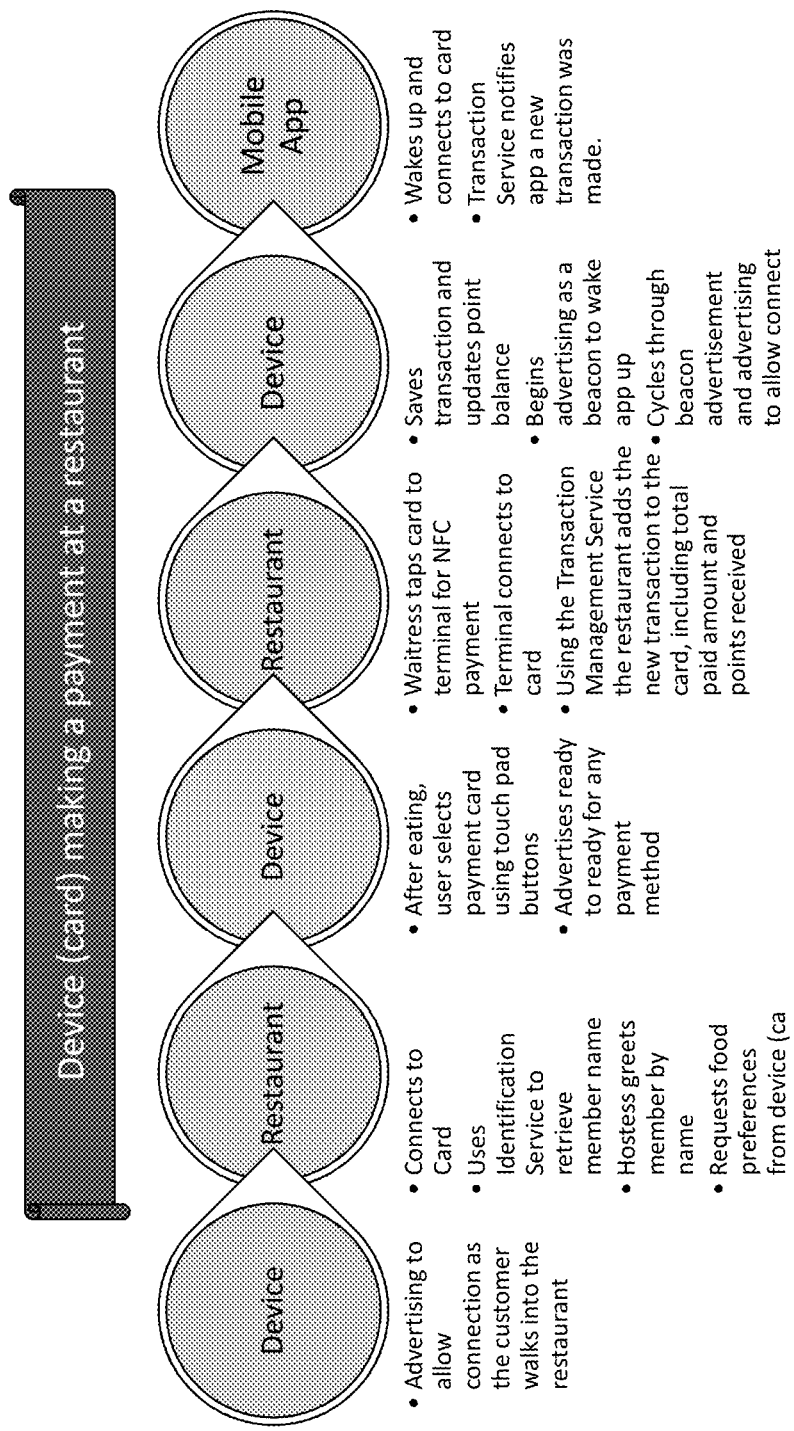
FIG. 24 illustrates use of a card to make a transaction.

SERVICE EXAMPLES: TRANSACTION SERVICE: FIG. 24 illustrates a "transaction service" whereby, in this non-limiting example, a restaurant (waiter or waitress or user) requests a payment after establishing a connection with a device and receiving and greeting a member via identification service, and receiving preferences per preference service. A user selects a payment method using a second device, in this non-limiting example, and hands the first device to a waitress or waiter who thereby makes a payment with the first device via one of several payments methods, NFC in this non-limiting example.

Transactions may include card-to-card transactions (as in the smart card example), mobile to card, or any first device to a second device. Transactions could exchange rewards, points, currencies, business cards, and other information.

In some embodiments, a first device (such as a smart card for a non-limiting example), may be detected by a second device (such as a taxi or toll), and provide payment or account or alias information to an account to make a payment transaction.

Upon completion of the payment transaction, a point-of-sale (PoS) device may send reward information to the user device via a personalized "reward service." Under this non-limiting example, transactions performed or reward points may be sent to a first device, then to an application that removes them from device after "synchronizing" the reward point total before updating the reward balance on the first device.

As transactions are completed, a user device may periodically wake-up a mobile app on the user's phone, which then establishes a communication connection and receives transaction information from the device. As communications are established between a device and other devices or services, one or more transactions saved on the device may be transferred to an application, server, cloud or other entity that may have more memory, bandwidth, sustainable power, processing power or the like, and deleted from the user device which may have limited memory as a wearable or other device. Reward points and/or currencies such as crypto-currencies may also be synchronized between the user device and other devices, applications, servers or cloud.

Devices associated with establishments may also respond to communication and/or a beacon with information such as advertisements or requests for payment. Establishments may also recommend a specific payment method that a user possess such as specific payment account, or advertise a new payment account whereby the user may "sign-up" by approving the transfer of private information requested by the establishment.

SERVICE EXAMPLES: PAYMENT SUGGESTION: In some embodiments, a second device may make customize a suggestion to a first device or another user device as to which transaction method or type perform the transaction. Such as personalized "suggestion service" may suggest information to perform a transaction with, such as a payment method such as but not limited to NFC, EMV, Wi-Mag and the like; a token or tokenization method, cryptogram, or the like; a payment card such as but not limited to a specific credit or debit card, a payment account, alias to any of the previously mentions payment accounts or the like; a rewards or loyalty account or number; or sales, discounts, promotions, coupons, or the like. Suggestions could be triggered by a variety of means including but not limiting to preferences and/or store name or location.

SERVICE EXAMPLES: LOCATION: In another embodiment, a "location service" on a second device sends an advertisement packet to wake-up a user device or "first device" after detecting a business, entity or establishment is nearby. Location services enable lower power devices such as smart cards, bands, watches and the like to remain "asleep", or at a low power state, until a location is detected. Location may be achieved using a variety of means not limited to beacons, Bluetooth power measurements, TDOA (Time Difference of Arrival), RFDOA (Radio Frequency Difference of Arrival), triangulation (where two or more devices triangulate with one or more other devices), or in some embodiments, GPS (Global Positioning System, which uses satellites to locate one or more devices) or simply a message sent from a second device to a first device indicating the business name or location.

Figure 25:
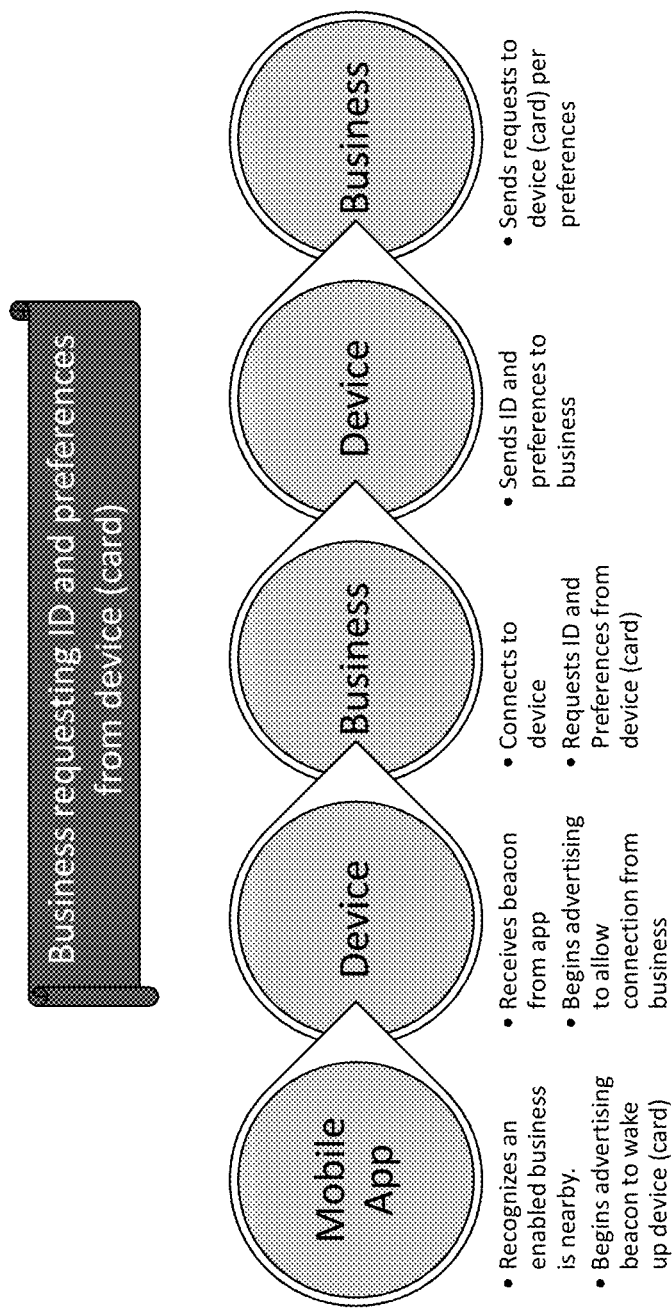
FIGS. 25 and 26 illustrate business-related transactions.
Figure 26:
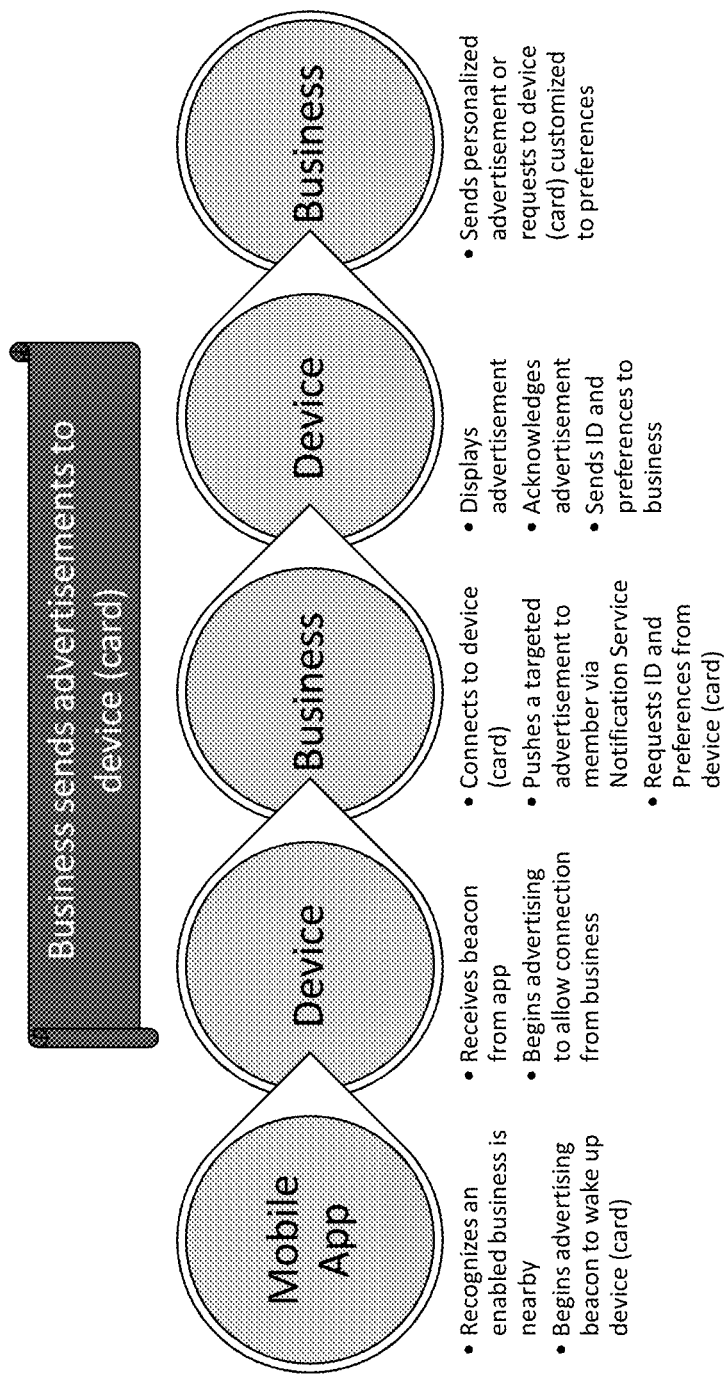

FIG. 25 is another non-limiting example whereby a first device may send identification and/or "preferences" as requested by a second device, in this case a business establishment, and the second device may send commercial advertisements or other information tailored to the preferences received per a personalized "advertisement service". Advertisements may include but not be limited to sales, discounts, promotions, coupons, marketing materials, brochures, clubs, loyalty, reward, programs or any multi-media or electronic advertisement. In some embodiments, an advertisement may be sent to a first device electronically where in other embodiments advertisements may be communicated visibly, audibly, or combination via multi-media.

The introduction of preference-based personalized services under this invention opens up a plethora of new and exciting applications and service that bring convenience to the user while shopping, driving, dining, eating, drinking, traveling and other activities where preferences may make user activities more convenient.

SERVICE EXAMPLES: SHOPPING: A non-limiting example of personalized services responsive to preferences performed during shopping. As a user walks into a store, mall or other business establishment, a device such as but not limited to a visual, audio or multi-media display, bulletin board or the like may personalize the advertisement or content on the bulletin board responsive to information such as shopping preferences gathered from a first device owned, operated, or carried by the user. Since many establishments may have more than one person pass by a specific location, the second device may choose to customize content based on preferences received from a single device, multiple devices, an average, or another statistical approach.

DRIVING: Similar to shopping at retail stores, malls, and other land-based establishments, another non-limiting example relates to the presentation of advertisements while driving. As users of devices containing preferences drive along a road, second devices communicating with billboards may personalize content in response to preferences received by one or more individuals within an automobile. Like multiple people walking past a multi-media display in a store or mall, the second device may choose preferences from a single, multiple, average, or statistical method. Under some embodiments, the first device may be a wearable, mobile, or other device, or in some embodiments, physically attached to an automobile, bicycle, skateboard or other transportation device.

In some embodiments, a first device is able to characterize motion as driving, and conserve power by configuring itself in various power saving modes. One such non-limiting mode comprises configuring itself with preferences in a passive or semi-passive mode, waiting for a signal from a second device, in this case a device associated with a billboard or equivalent roadside advertisement. Once a signal from the second device is received by a first device, the first device wakes up and provides DINING: In another non-limiting example, a user may enter a restaurant. Upon entering the restaurant, the user's preferences for dining may be automatically transferred to one or more devices of the restaurant. Preferences as referenced herein may include but are not limited to preferred foods, allergens, favorite entrees, favorite appetizers, favorite beverages and desserts, food and drinks most commonly ordered by the user, and/or any other non-limiting diet information. After the user's preferences have been shared, one or more advertisements may be displayed or read to the user including but not limited to menu items, deals, and/or promotions.

In some non-limiting embodiments, a warning may be displayed or illustrated to the user if the user attempts to click, select, view or order a menu item that is an allergen. In other embodiments, items and other content on the electronic menu are customized responsive to preferences such as likes and dislikes of food, beverages, smoking, seating, allergies, ingredients, spices, temperature, time cooked (well done, medium, rare, etc.), dishes, cuisine, meals, quantity and the like. This preferential menu can better serve GROCERIES: In another non-limiting example of services provided according to a user's preferences, a user may enter a store or other non-limiting institution including a grocery store, the user's preferences may be downloaded from a user device to the grocery store. After receiving the user's preferences, the grocery store may add the user to one or more of its membership programs based on the user's preferences. Additionally, responsive to the provided preferences, a grocery store device can communicate with the user's device and identify locations for her grocery preferences, prices therefor, healthy alternatives, etc.

The user device may also include a list of needed grocery items, as determined by a prior communication session with another device in the user's house (monitoring refrigerator contents, for example). This shopping list can be communicated to a device in the grocery store in a similar fashion to the grocery preferences.

TRAVEL: A non-limiting example includes traveling on a trip. Consider travel where typically time-consuming activities are automated. For instance, as the owner of the information on a device walks through the pre-check at the airport, the authorities may automatically approve the user based on information released from the device. In one embodiment, a smart card, watch or "travel band", as non-limiting examples of "devices", may wake-up, characterize the movement of the individual, and send data at an interval either configured by the user, based on activity, and/or the characterization of movement, or combinations.

Personalized services that might be used in this example include wake-up, identification and authentication services.

Information that is transferred between devices under this embodiment may include but is not limited to an approval code, authentication code, or other cryptographic message; reward number; flight or train number; geographic information such as but not limited to locations traveled in the last n days; the number of authentications the user has performed with the user device, or similarly, the time of each authentication the owner has authenticated with the device and/or the type of authentication; and personal info such as name, address, location staying while in country, allergies, medical issues, shot records, phone number, date of birth, passport number and other passport or visa information, drivers license and/or other personal identifying information. In some embodiments, this information may be in the form of a token, generated from one or more of the information described above and recognized by one or more establishment (or security, in this case) devices.

Another example is when a user walks into an establishment such as a plane, train, taxi, hotel, restaurant, entertainment establishment (bars, night clubs, theaters, musicals, casinos or other entertainment establishments), and the like. A beacon may be transmitted at an interval configured by the user or by characterization of the movement of the person, derived from an accelerometer or equivalent component on the device, or a combination of both. Here, the establishment may personalize the service to the customer by greeting the owner of the information on the user device such as "welcome Mr. Tunnell" as he or she approaches the lobby, counter, table or equivalent location by receiving some identifying information via the beacon, Bluetooth, BLE, WiFi or equivalent communication.

Information that can be exchanged according to this non-limiting example includes, a user's name, seat number, preferences such as smoking or non-smoking, pets or no pets, allergies, medical issues, shot records, connecting flights or trains, dining and/or drinking preferences, seating, sleeping and/or other preferences that personalize the service to the user.

Figure 27:
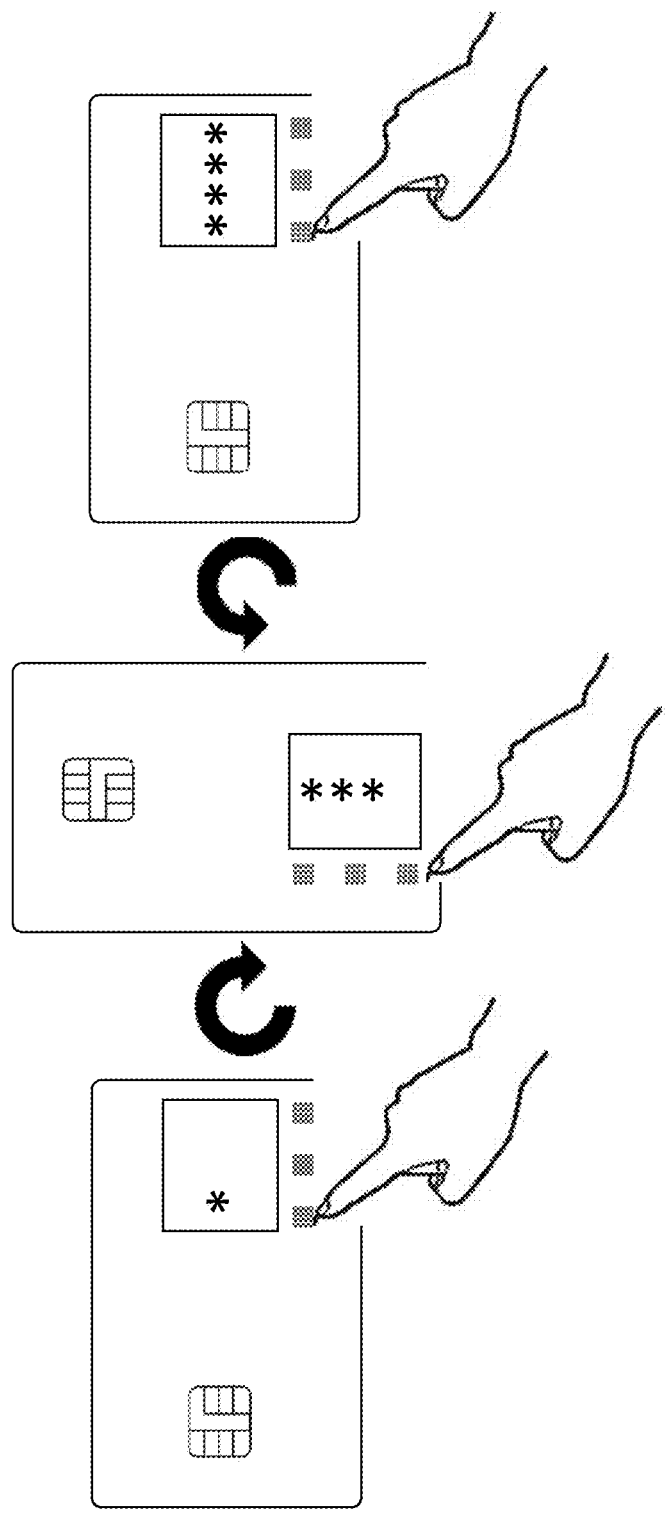
FIGS. 27 and 28 illustrate gesture and position PINS.
Figure 28:
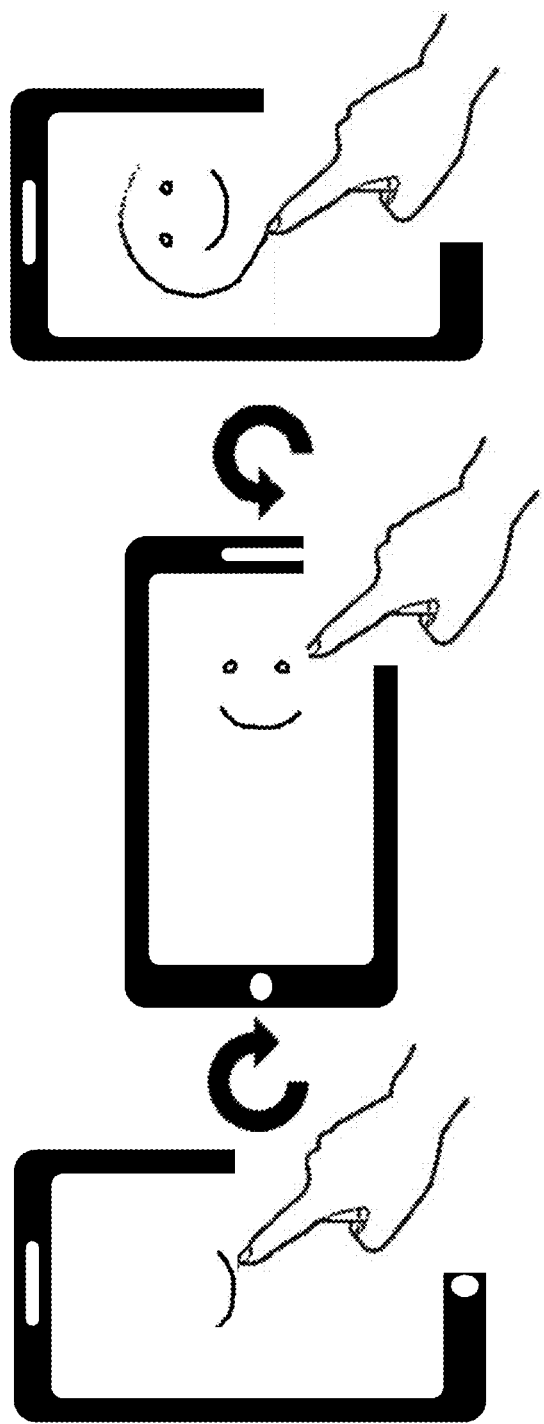

SECURITY: In another embodiment, the user may be prompted to perform an additional authentication, such as but not limited to type in a PIN (Personal Identification Number), Tap Code (tap areas on a device), Tap Code/Position combination (where the tap code is entered for as the device is held in one or more positions for form a "position PIN"), password, gesture, biometrics and the like, or combinations of each or additional authentication steps such as but not limited to answering personal questions. Under this embodiment, the device could notify the user via some sound, words, vibration, buzzer, display, or in other embodiments, by sending a notification to another device, such as a phone, watch, band, and/or jewelry to notify the user that additional information and/or authentication is required. See examples set forth in FIG. 27 (position in conjunction with tapping a card sensor) and FIG. 28 (drawing a gesture on a display of a smart phone while the smart phone is placed in different positions).

Position PINs are further described in the co-owned patent application entitled Methods and Systems Related to Multi-Factor Multi-Dimensional Hidden Security PINS, filed on Jul. 30, 2015 and assigned application No. 62/198,817, which is incorporated herein in its entirety.

Figure 29:
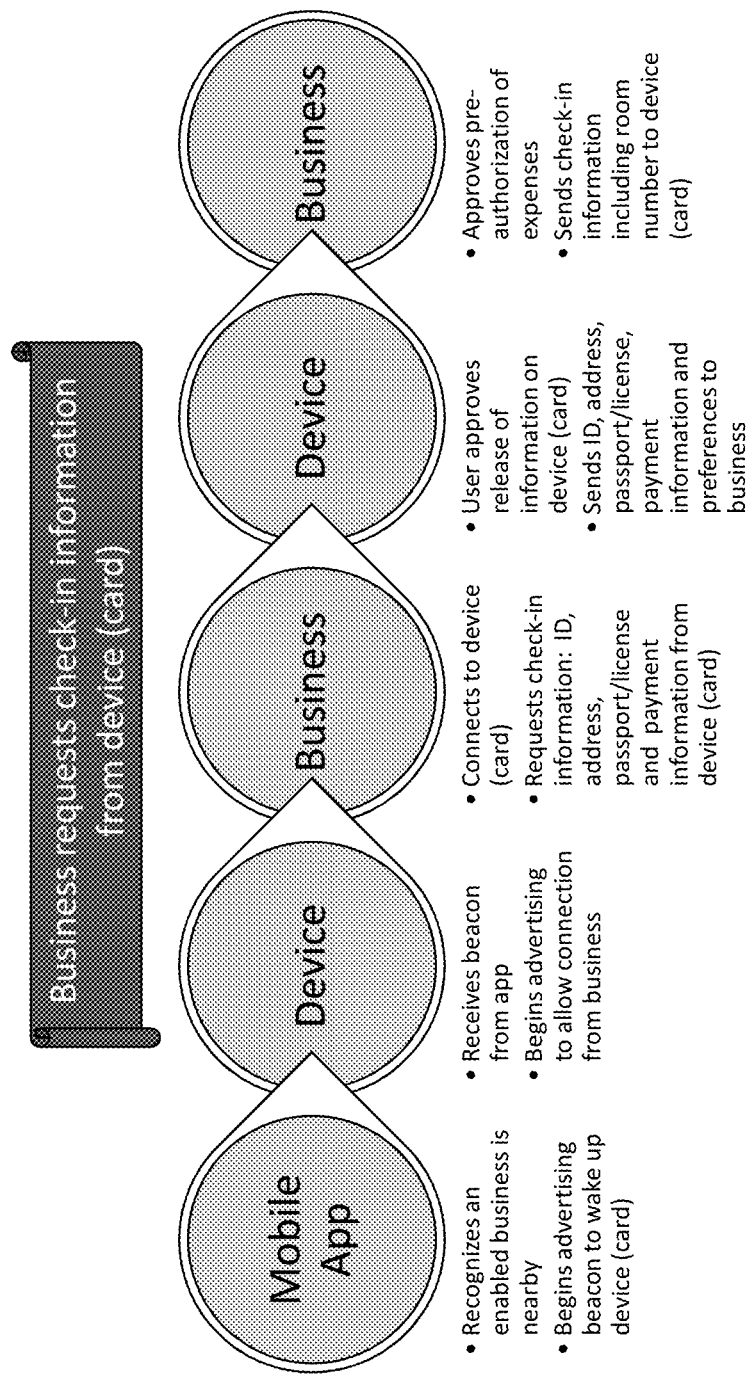
FIG. 29 illustrates a request for check-in information.

ACCOMMODATIONS: As the user approaches a hotel lobby, the user device could be interrogated (communicate) with the establishment device to obtain information to check-in the individual. Thus, under this embodiment, the owner of the information could configure the device to automatically check-in the individual by releasing the pertinent information. In some embodiments, the user may be prompted to approve the release of certain private information, such as but not limited to payment account information. Thus, as an establishment could check-in the owner of the information on the user device as the owner approaches the lobby. FIG. 29 illustrates a check-in process using a mobile application that responds to a beacon signal and executes a check-in procedure.

Information that can be exchanged according to this embodiment includes but is not limited to an approval code, authentication code, or other cryptographic message; reward number; flight or train number; geographic information such as but not limited to locations traveled in the last "n" days; the number of authentications the user has performed with the user device, or similarly, the time of each authentication the owner has authenticated with the device and/or the type of authentication; payment information; and personal info such as name, address, location staying while in country, allergies, medical issues, shot records, phone number, date of birth, passport number and other passport or visa information, drivers license and/or other personal identifying information, and/or any other information regarding customizing the service for a specific individual or room.

ROOM KEYS: One or more establishment devices may also respond by downloading one or more room keys to a user device. This information for the room key could be in the form of a token or other cryptogram, or some other identifier, key or the like. Validity time duration, room number, and other information may also be sent to the device where the user device may then be used as a room key, specific for a given room or duration, or access to other entertainment or locations.

Once configured, the device may be used to open a door just like a room key. In this embodiment, a door may be opened using method such as those described in the commonly-owned patent application entitled Universal Authentication and Data Exchange Method, System and Service, filed on Mar. 17, 2014, and assigned application Ser. No. 14/217,289, which is incorporated herein in its entirety.

These methods include magnetic stripe, wireless magnetic stripe, NFC, Bluetooth, BLE, WiFi, RFID, sound, light, and the like.

ADMINISTRATION (CHANGE PREFERENCES): Under another non-limiting example of an "administration service", the mobile app sends a wake-up signal to the device, which upon receipt, begins advertising to allow connection. Under this embodiment, communications could be established from over physical contacts, such as from a laptop to EMV contacts on a smart card device via a USB to smart card reader as a non-limiting example, or via a Bluetooth advertisement packet from a smart phone to a smart watch, as another non-limiting example.

Upon connecting with the device, users may perform various administrative functions via the application such as but not limited to assigning or un-assigning a member, updating software and rebooting, retrieving the firmware version and battery level of the device, and adding/modifying and/or deleting categories, records, and public and private information with the device.

AUTHENTICATION SERVICE: Another example of a personalized service includes authentication. Authentication may be performed by symmetric, asymmetric, biometrics, knowledge-metrics, behavior-metrics, public/private and/or combinations and/or other methods. One such method employs risk scores without passing personal information such as but not limited to the techniques described in the co-pending, commonly-owned patent application assigned application Ser. No. 14/217,202, entitled The Unpassword: Risk Aware End-to-End Multi-Factor Authentication via Dynamic Pairing, and filed on Mar. 17, 2014, which is incorporated herein in its entirety.

In some embodiments, the user device may be used to authenticate with other devices such as internet, servers, applications, websites, phones, tablets, laptops, desktop and other computing devices, as well as IOT (Internet of Things) devices such as environmental, lighting, fire and security alarms, fans, refrigerators, cooking and dish washing devices, and entertainment devices so that services such as but not limited to lighting, food, alarms, music, television, and the like may be personalized by the presence of the user device.

Information the user's device may store and/or generate includes such as but not limited to user names, passwords, keys, and/or dynamic pairing codes such that end-to-end authentication and/or encryption/decryption may take place between the user device and other devices. In this way, the user device may be used as an FOB or authentication device for other devices.

NOTIFICATION SERVICE: A device and a mobile app may send notifications to one another. Notifications from the may include texts, chats, emails, phone calls, and the like, but also battery charge or level, payment method, connectivity, and the like. In some embodiments, notifications may also activate and light and LED. Notifications may also be sent to devices responsive to notifications, messages, text messages, phone calls, emails, alarms, accounting information, budget information, fraud alerts, other alerts and any notices that require alerting the user or device. For a non-limiting example, a first device stores telephone numbers of a user. When a second device receives a fraud alert from a bank, the second device contacts a first device to obtain the telephone number, whereby the first device provides the number, the second device calls the phone number and the user answers.

SWIMMING (NOTIFICATIONS): In a non-limiting example of notifications, a user may wish to go for a swim. Since the device is indeed his or her room key and is waterproof, the user may wish to leave his or her cell phone behind and just take the user device with the room key information with him. If the user decides to take his or her cell phone with him, notifications from the cell phone to the user device may keep the user up to date on texts, chats, emails, phone calls, and the like while in the pool. If the user wishes to purchase some food or a drink, the user may simply select the payment account from multiple payment accounts stored on the user device and make the payment using any one of multiple payment communications including but not limited to EMV, NFC, magnetic stripe, Wi-Mag, QR Code, BLE and the like.

REWARDS: As a user utilizes the user device for payment, rewards may be notified back to the user on the user device. This may be accomplished by the user device receiving specific information regarding the transaction including but not limited to amount, time of purchase, items purchased, store name, location and the like. For point-of-sale (POS) systems that cannot communicate back to the user device directly, a service and/or app may collect data from the financial institution holding the owner's account and send that to an app on a user's device, such as a cell phone, that then in turn collects and/or sends the transaction information to/from the user device to calculate the reward, points or the like for the transaction. If the reward is not calculated local to the user device, as in some embodiments, it may be calculated by the service and/or app, and send to the user device for display on the display local to the user device. In this way, the user may keep track of all rewards for various reward and loyalty accounts as transactions are made.

POCKET ACCOUNTANT: An additional feature of this "closed-loop" system of collecting transaction information for every transaction is fraud prevention. Since every transaction to an account may be sent to a user's device via a service or app, the user may confirm or deny the transaction. The application may also automatically match the payment information received from the point of sale system with the payment information received by the user device from a service that sends payment information to the app from a bank or issuer.

In addition, each transaction may be approved by the user and tracked per a specific category or code or accounting code in order to maintain a budget. The closed transactional method and system could maintain a budget for multiple parties, such that a husband and wife could view each others purchases, and determine how much has been spent against a budgeted amount for a given category. The specific transactions may be coded, either automatically or via suggestion to the user, for accounting purposes. Thus, typical expenses for a household or business may be tracked via codes such as travel, food, office and the like.

The invention herein incorporates each of these features within the user device, and in some embodiments, the user device, an app on a phone or other computing device, or service on a server or cloud, or combinations of each.

Other exemplary services that can be provided according to the present invention relate to: a check-In service wherein private information is released from a card or device to check-in at an establishment; inventory management detection of all contents in close proximity to a device or card (e.g., a wallet, purse, luggage); a preferences analytics service wherein preferences are tailored to a history of information collected from a card or user, such as locations visited, transactions performed (amount, what was purchased, etc.), spending habits, trends, then combined with other analytics collected from social media, such as likes/dislikes, from web search services.

An exemplary system for implementing the various software aspects of the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. System memory, removable storage and non-removable storage are all examples of computer storage media. Non-transitory computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by computing device. Any such computer storage media may be part of device. A computing device may also have input device(s) such as a keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Several co-owned applications are related to the present invention and each is incorporated herein in its entirety, including: the patent application filed on Jun. 23, 2015 and assigned application Ser. No. 15/191,466, entitled Personalized and Intelligently Connected Method and System to Authenticate and Backup Data on a Device; the provisional patent application filed on Jul. 5, 2015 and assigned application No. 62/188,684, entitled Behavioral-Directed Authentication Method and System; the provisional patent application filed on Apr. 3, 2015 and assigned application No. 62/143,028, entitled Miniature, Multi-purpose Antenna Method and System for Low-Power Close-Proximity Communications and Energy Transfer; the provisional patent application filed on Jul. 14, 2015 and assigned application No. 62/192,218, entitled Personalized Tokenization System and Method.

In some other embodiments, the establishment may send the beacon, while the device may receive the beacon and respond, or vice versa. The present invention is not specific to which devices send the beacon. Information that the establishment may send may include but not be limited to store name, identity, geolocation, advertisement, and the like. In other embodiments, the device and the establishment may simply communication with one another. In yet another embodiment, the device may send a beacon or communication with another device, such as a smart phone. Information that may be passed includes configuration information from a user interface on an application on the phone.

What is claimed is:
1. A system for supplying information to a purchaser, the system comprising:
a first device for storing product preferences of the purchaser and broadcasting relevant product preferences upon entering an establishment or responsive to receiving a signal upon entering the establishment, the relevant product preferences limited to products available for purchase within the establishment, the first device in a sleep state and upon entering the establishment or receiving the signal, the first device switched to an awake state;

a receiving device receiving the relevant product preferences; and the receiving device or a second device responsive to the receiving device presenting information to the purchaser that is customized to the relevant product preferences, and includes a location within the establishment of products available for purchase that are responsive to the relevant product references, the information presented as an image on a display, sound from a speaker, video images, still images, or sound on a multimedia device.

2. The system of claim 1 wherein the establishment comprises an overnight accommodation facility, and wherein the information comprises downloading a room key to the first device or configuring the first device to function as a room key.

3. The system of claim 1 wherein the first device is one of a smart card, a smart wallet, a smart phone, a wearable device, a mobile device or a portable device.

4. The system of claim 1 wherein the video image or the still image comprises current advertisements.

5. The system of claim 1 wherein one or more of the relevant product preferences is assigned a weight and the information provided to the purchaser is responsive to the weight, and wherein the weigh is changed based on subsequent behavior of the purchaser.

6. The system of claim 1 wherein the information is derived from an aggregate or an average of the relevant product preferences received from more than one first device.

7. The system of claim 1 wherein the information presented comprises advertisement information responsive to a current location of the purchaser and related to a product preference proximate the current location of the purchaser.

8. The system of claim 1 wherein the purchaser is within the establishment and the information presented to the purchaser comprises an advertisement for a product and a location of the product within the establishment.

9. The system of claim 1 the relevant preferences comprising pre-approved preferences for broadcast without intervention of the purchaser and approval preferences requiring purchaser approval prior to broadcasting.

10. The system of claim 1 wherein the relevant preferences are divided into classes, and each class is governed by authentication and encryption requirements.

* * * * *